United States Patent [19]
Kume et al.

[11] Patent Number: 6,115,098
[45] Date of Patent: Sep. 5, 2000

[54] LCD HAVING AN LC LAYER WITH SPACERS ARRANGED SO THAT LC MOLECULES ARE IN AXIAL SYMMETRY UPON APPLICATION OF VOLTAGE

[75] Inventors: Yasuhiro Kume, Nara; Kenji Hamada, Toki; Masahiko Kondo, Nara-ken; Takashi Kurihara, Tajimi; Masato Imai, Tajimi; Kazuyuki Endo, Tajimi, all of Japan

[73] Assignees: Sharp Kabushiki Kaisha, Osaka; Sony Corporation, Tokyo, both of Japan

[21] Appl. No.: 09/219,847

[22] Filed: Dec. 23, 1998

[30] Foreign Application Priority Data

Dec. 25, 1997 [JP] Japan ............................ 9-358576
Jun. 30, 1998 [JP] Japan ............................ 10-185491

[51] Int. Cl.[7] .................................................. G02F 1/1339
[52] U.S. Cl. .................................... 349/156; 130/32
[58] Field of Search ................... 349/156, 130, 349/32

[56] References Cited

U.S. PATENT DOCUMENTS

| | | | |
|---|---|---|---|
| 5,182,664 | 1/1993 | Clerc | 359/93 |
| 5,880,803 | 3/1999 | Tamai et al. | 349/156 |
| 5,917,572 | 6/1999 | Kurauchi et al. | 349/156 |
| 5,995,191 | 11/1999 | Tamai et al. | 349/156 |

FOREIGN PATENT DOCUMENTS

| | | |
|---|---|---|
| 1-217396 | 8/1989 | Japan . |
| 4-285931 | 10/1992 | Japan . |
| 6-175133 | 6/1994 | Japan . |
| 6-265912 | 9/1994 | Japan . |
| 6-273735 | 9/1994 | Japan . |
| 6-301015 | 10/1994 | Japan . |
| 7-120728 | 5/1995 | Japan . |
| 9-197384 | 7/1997 | Japan . |
| 10-186330 | 7/1998 | Japan . |

*Primary Examiner*—James A. Dudek
*Attorney, Agent, or Firm*—Nixon & Vanderhye P.C.

[57] ABSTRACT

A liquid crystal display device of the present invention includes: first and second substrates; a liquid crystal layer interposed between the first and second substrates; a plurality of pillar-like spacers for defining a gap between the first and second substrates; a plurality of electrodes provided on a side of each of the first and second substrates which faces the liquid crystal layer, for applying a voltage through the liquid crystal layer; and a plurality of pixel regions defined by the plurality of electrodes. The liquid crystal layer has liquid crystal molecules having a negative dielectric anisotropy. A vertical alignment layer is provided on a surface of each of the first and second substrates which faces the liquid crystal layer and on surfaces of the pillar-like spacers. The liquid crystal layer includes a plurality of liquid crystal regions defined by the plurality of pillar-like spacers. Each of the pixel regions includes at least one of the liquid crystal regions. The liquid crystal molecules in the liquid crystal regions are aligned substantially perpendicular to the surfaces of the first and second substrates in an absence of an applied voltage and in axial symmetry in a presence of an applied voltage.

23 Claims, 20 Drawing Sheets

FIG.3A
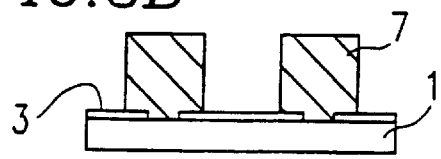
FIG.3B
FIG.3D
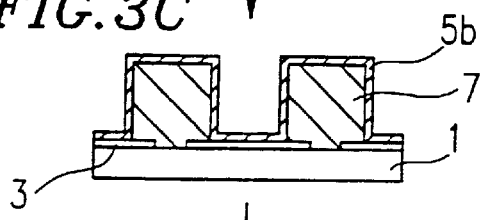
FIG.3C
FIG.3E
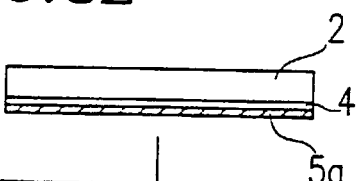
FIG.3F
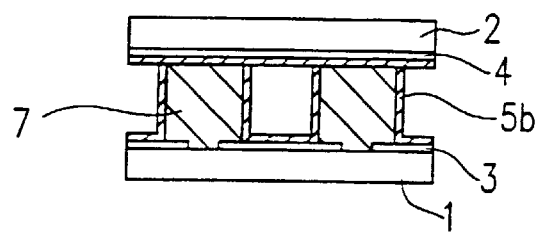
FIG.3G
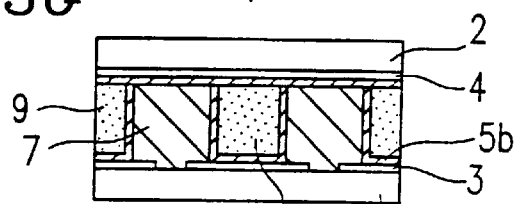
FIG.3H
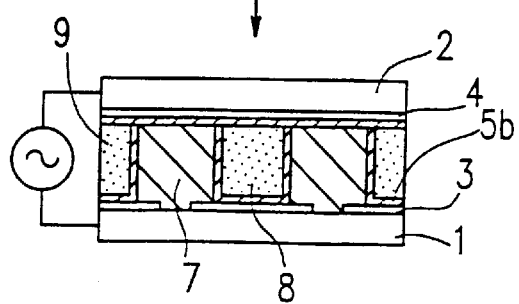

Extinction pattern

Extinction pattern

Extinction pattern

Extinction pattern

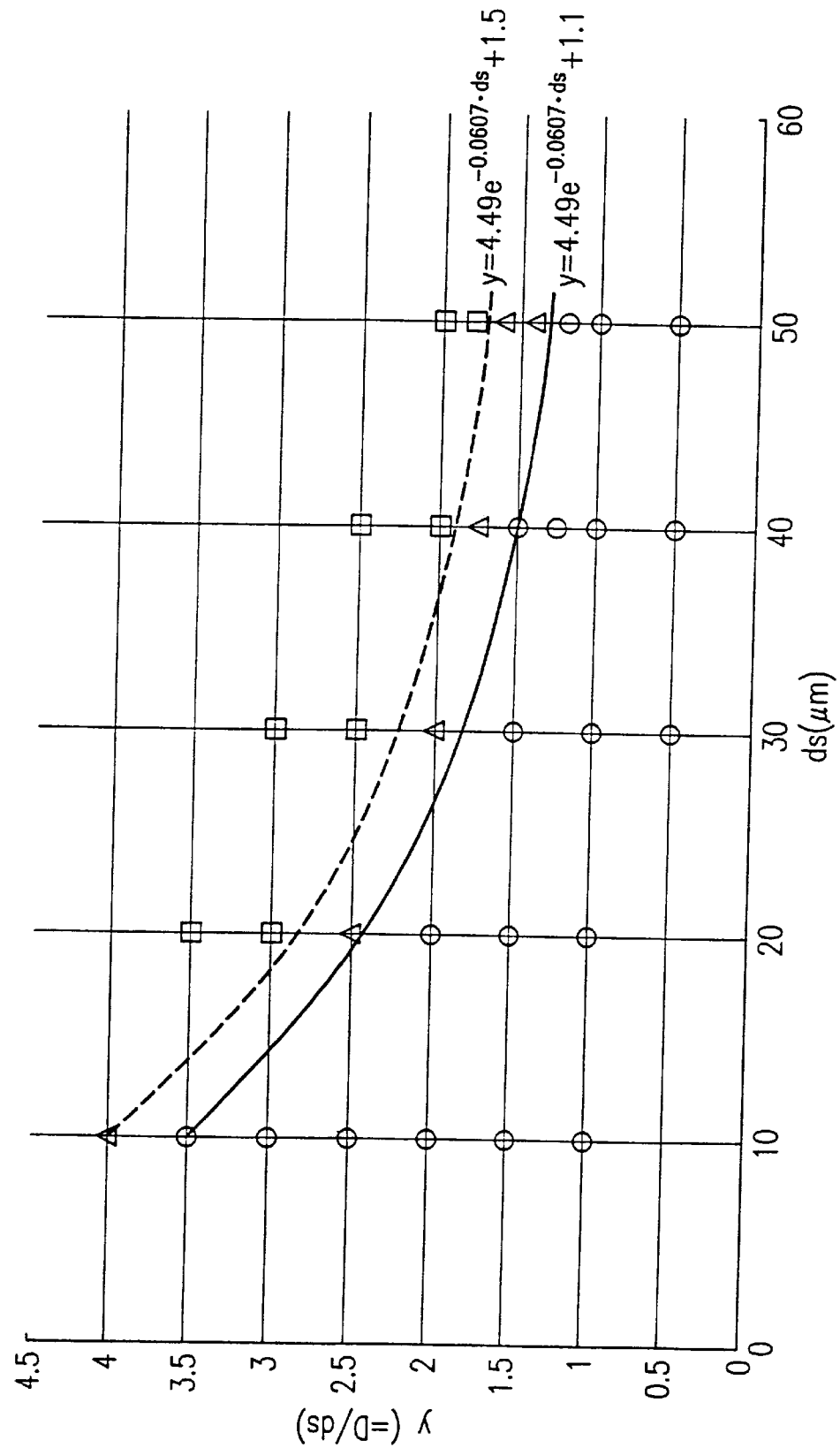

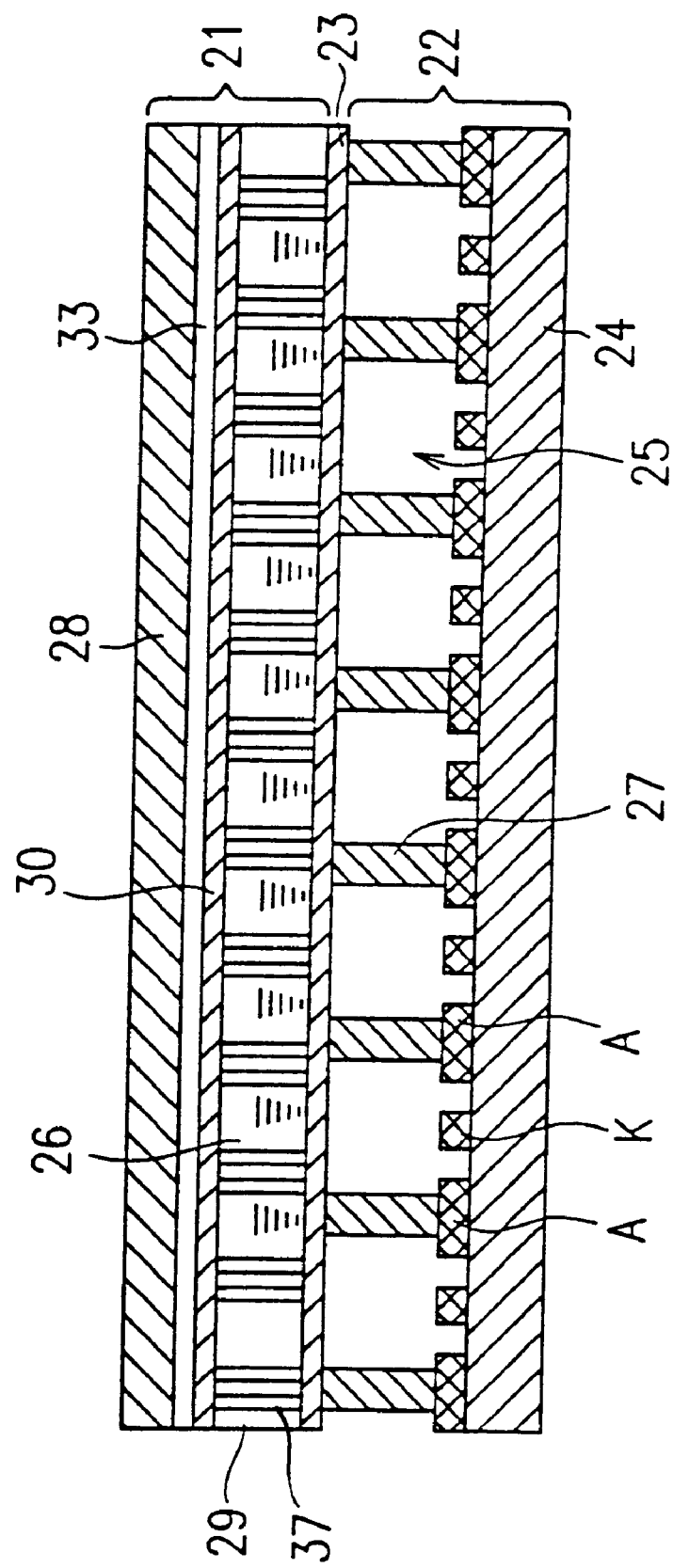

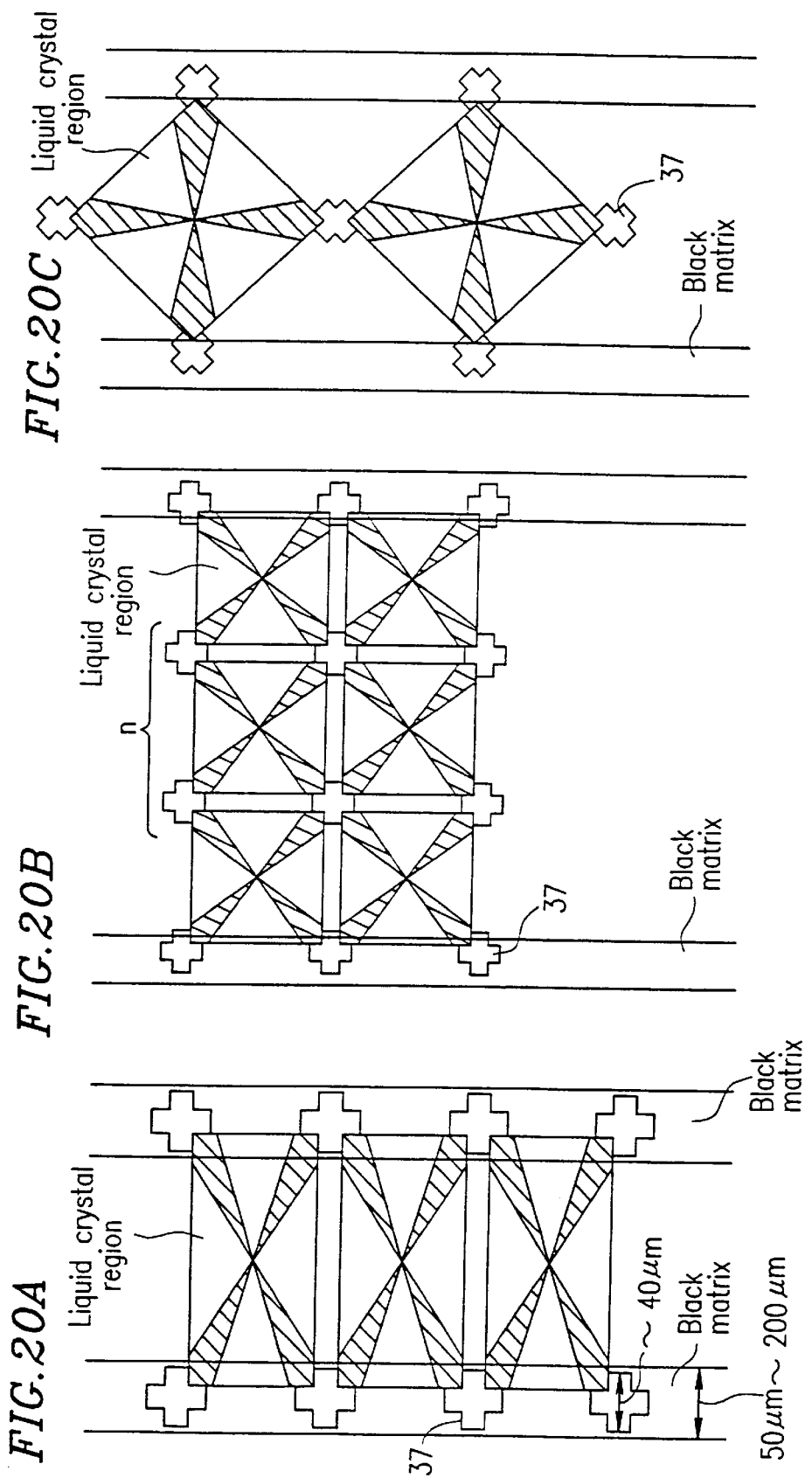

Cross shape

Rectangle

T shape

L shape

Circle

Ellipse

LCD HAVING AN LC LAYER WITH SPACERS ARRANGED SO THAT LC MOLECULES ARE IN AXIAL SYMMETRY UPON APPLICATION OF VOLTAGE

BACKGROUND OF THE INVENTION

1. Field of the Invention

The present invention relates to a liquid crystal display device (hereinafter, referred to simply as an "LCD device") having a wide viewing angle characteristic which is suitable for use in a flat display in a personal computer, a word processor, an amusement apparatus, a TV set, or the like.

2. Description of the Related Art

Currently, many LCD devices for use in such flat displays employ a TN (twisted nematic) mode. A TN mode LCD device has a relatively narrow viewing angle, and attempts have been made to improve the viewing angle of the TN mode LCD device.

Japanese Laid-Open Publication Nos. 6-301015 and 7-120728, for example, disclose a technique for improving the viewing angle by employing an ASM mode (Axially Symmetric Aligned Microcell Mode) where liquid crystal molecules are oriented in an axially symmetric pattern in each pixel. There are provided a plurality of polymer walls and a plurality of liquid crystal regions each containing a display medium (liquid crystal molecules) between a pair of substrates. Each liquid crystal region is surrounded by the polymer walls, and the liquid crystal molecules are oriented in axial symmetry in each liquid crystal region. This provides considerable improvement in the viewing angle characteristic of the device.

Japanese Laid-Open Publication No. 10-186330, for example, discloses another technique for relatively easily obtaining a high contrast LCD device having a good viewing angle characteristic in every azimuth angle. The device according to this technique includes a liquid crystal layer suitable for improving the viewing angle where the liquid crystal molecules are oriented in axial symmetry for each liquid crystal region. This technique will be described in greater detail below with reference to FIGS. 22A and 22B.

FIGS. 22A and 22B are sc hematic views illustrating an exemplary arrangement of a LCD device according to this technique. FIG. 22B is a plan view illustrating the exemplary arrangement, and FIG. 22A is a cross-sectional view taken along line Z–Z' in FIG. 22B. The LCD device includes glass substrates 101 and 102 opposing each other with a predetermined gap therebetween. A liquid crystal layer 109 containing a liquid crystal material having a negative dielectric anisotropy is provided between the substrates 101 and 102. A stripe pattern of signal electrodes 104 is provided on an inner surface (a surface facing the liquid crystal layer) of the substrate 102. A vertical alignment layer 105 of a polyimide, or the like, is provided to substantially cover the stripe pattern of the signal electrodes 104. A stripe pattern of plurality of signal electrodes 103 is provided on an inner surface of the substrate 101 so as to cross the stripe pattern of the signal electrodes 104. A plurality of partition walls 106 are further provided in a lattice-like arrangement on the signal electrodes 103. A plurality of pillar-like protrusions 107 are selectively provided on the partition walls 106 so as to extend toward the substrate 102. The partition walls 106 are patterned by, for example, exposing via a mask and developing a photosensitive resin. Similarly, the pillar-like protrusions 107 are patterned by, for example, exposing via a mask and developing a photosensitive resin. The signal electrodes 103 and 104, the partition walls 106 and the pillar-like protrusions 107 are covered by the vertical alignment layer 105 of a polyimide, or the like.

According to this technique, a location and size of each liquid crystal region 108 are defined in part by the surrounding partition walls 106. In the absence of an applied voltage between the signal electrodes 103 and 104, the liquid crystal molecules in each liquid crystal region 108 are aligned substantially vertically to the substrates 101 and 102. In the presence of an applied voltage between the signal electrodes 103 and 104, the liquid crystal molecules are oriented in axial symmetry within each liquid crystal region 108. The pillar-like protrusions 107 extending between the partition walls 106 and the substrate 102 serve to maintain a constant cell gap therebetween.

In order to stably achieve an axially symmetric orientation of the liquid crystal molecules in each liquid crystal region in the presence of an applied voltage, Japanese Laid-Open Publication No. 10-186330 also discloses an axially symmetric orientation fixing layer of a polymer material provided on a concave/convex surface on at least one of a pair of substrates in a region corresponding to each liquid crystal region. The axially symmetric orientation fixing layer can be provided by, for example, providing a precursor mixture containing a liquid crystal material having a negative dielectric anisotropy and a photocurable material between the pair of substrates, and then irradiating with light and curing the precursor mixture.

Japanese Laid-Open Publication Nos. 1-217396 and 4-285931, for example, disclose a plasma addressed liquid crystal display device (hereinafter, referred to simply as a "PALCD device"). A PALCD device has been known in the art and developed as a large-screen display device exceeding 20 inches diagonally, which is expected to replace the above-described TN mode LCD device, or a TFT-LCD device, which uses a TFT (thin film transistor) as a switching element for controlling ON/OFF switching of each pixel.

Referring to FIG. 23, a PALCD device includes a transparent substrate 201 and a plasma generation substrate 210 with a liquid crystal layer 202 interposed therebetween. The plasma generation substrate 210 includes a dielectric sheet 216 and a substrate 211 opposing each other, with a stripe pattern of partition walls 212 interposed between the substrate 211 and the dielectric sheet 216. A plurality of discharge channels 213 are arranged in a stripe pattern in a space surrounded by adjacent partition walls 212, the substrate 211 and the dielectric sheet 216. Each channel 213 contains a gas to be ionized by discharge between an anode electrode 214 and a cathode electrode 215. On a side of the transparent substrate 201 facing the liquid crystal layer 202, a stripe pattern of transparent electrodes 205 which serve as data electrodes is provided so as to be substantially perpendicular to the stripe pattern of the discharge channels 213. The liquid crystal layer 202 is provided between the substrate 201 and the dielectric sheet 216. A constant cell gap is maintained between the substrate 201 and the dielectric sheet 216 by a cell gap regulating material 206 such as plastic beads (i.e., particle spacers). An alignment film (now shown) is provided on a surface of each of the substrate 201 and dielectric sheet 216 facing the liquid crystal layer 202.

Japanese Laid-Open Publication No. 9-197384, for example, discloses a technique for improving the viewing angle of a PALCD device. Referring to FIGS. 24A and 24B, the liquid crystal cell includes a plurality of polymer walls which define a plurality of liquid crystal regions each containing a display medium, in which the polymer walls also serve as a cell gap regulating material.

FIG. 24A is a cross-sectional view illustrating a PALCD device according to this technique, and FIG. 24B is a plan view illustrating the pixel arrangement thereof. In FIGS. 23, 24A and 24B, like reference numerals denote like elements.

The PALCD device illustrated in FIGS. 24A and 24B is different from that illustrated in FIG. 23 in that the PALCD device illustrated in FIGS. 24A and 24B employs a display medium 220 which corresponds to the liquid crystal layer 202 of the PALCD device illustrated in FIG. 23. The display medium 220 includes a plurality of liquid crystal regions 220*a* and polymer walls 220*b* surrounding the respective liquid crystal regions 220*a*. The liquid crystal molecules in each liquid crystal region 220*a* are oriented in axial symmetry. The liquid crystal regions 220*a* are arranged in a matrix, as illustrated in FIG. 24B. The PALCD device further includes polarizers 221 and 222, as illustrated in FIG. 24A.

Japanese Laid-Open Publication No. 9-197384 also discloses a PALCD device, as illustrated in FIGS. 25A and 25B, which includes spacer walls 223 in the display medium crossing at least one of the partition walls 212.

FIG. 25A is a cross-sectional view illustrating the PALCD device, and FIG. 25B is a plan view thereof. In FIGS. 23, 25A and 25B, like reference numerals denote like elements. As illustrated in FIG. 25B, the PALCD device includes the spacer walls 223 between the substrate 201 and the plasma generation substrate 210 interposing the display medium 220 therebetween. The spacer walls 223 cross at least one of the partition walls 212 which separate the respective discharge channels 213 provided in the plasma generation substrate 210. Like the partition walls 212 of the plasma generation substrate 210, the spacer walls 223 also serve as means for maintaining a constant cell gap between the substrates 201 and 210.

However, the above-described wide viewing angle LCD devices and the PALCD devices had the following problems.

(1) In the wide viewing angle (ASM mode) LCD devices disclosed in Japanese Laid-Open Publication Nos. 6-301015 and 7-120728, the polymer walls and the liquid crystal regions are formed through phase separation of a mixture containing a liquid crystal material having a positive dielectric anisotropy and a photocurable resin. This requires a phase separation process which requires complicated temperature control, and such a LCD device is difficult to produce. Moreover, the obtained axially symmetric orientation will be unstable, thereby reducing the reliability of the device particularly under high temperature conditions.

(2) In the wide viewing angle (ASM mode) LCD device disclosed in Japanese Laid-Open Publication No. 10-186330, the display medium has a two layer structure which includes partition walls and pillar-like protrusions selectively provided on the partition walls. Production of such a structure requires two patterning steps, thereby increasing the production cost of the device and the production tact time. Moreover, this requires precise alignment, thereby necessitating an alignment margin and thus reducing the production yield of the device.

(3) In the PALCD devices disclosed in Japanese Laid-Open Publication Nos. 1-217396 and 4-285931, if beads are employed to maintain the cell gap of the device, the contact area between the beads and the substrate, or the like, is small. Therefore, during production of the liquid crystal cell and vacuum injection of a display medium, a stress is locally applied on the contact area between the beads and the substrate, or the like, whereby the dielectric sheet separating the channels and the display medium may be damaged.

(4) In the PALCD device disclosed in Japanese Laid-Open Publication No. 9-197384, the polymer walls and the liquid crystal regions are formed through phase separation of a mixture containing a liquid crystal material and a photocurable resin. This requires a phase separation process which requires complicated temperature control, and such a LCD device is difficult to produce. Moreover, the obtained axially symmetric orientation will be unstable, thereby reducing the reliability of the device particularly under high temperature conditions.

(5) The wide viewing angle (ASM mode) LCD device disclosed in Japanese Laid-Open Publication No. 10-186330 includes the partition walls provided in a lattice pattern so as to substantially surround the respective liquid crystal regions. The PALCD device disclosed in Japanese Laid-Open Publication No. 9-197384 includes the spacer walls provided to cross the partition walls. In these techniques, a liquid crystal material is injected into a liquid crystal cell after the partition walls (Japanese Laid-Open Publication No. 10-186330) or the spacer walls (Japanese Laid-Open Publication No. 9-197384) are formed. Therefore, the partition walls or the spacer walls may obstruct the injection of the liquid crystal material, thereby reducing a rate at which the liquid crystal material is injected. This increases the injection time and the production cost of the devices.

(6) Typically, a liquid crystal material for use in an LCD device is a mixture containing a number of different liquid crystal compounds. When injecting such a liquid crystal material mixture into a liquid crystal cell, there is a difference in travelling speed and distribution coefficient among the various compounds. This difference causes an in-plane distribution of the liquid crystal compounds in the liquid crystal cell in relation to the composition ratio of the mixture based on the distance from the injection port of the cell. This is called "a chromatographic phenomenon". The chromatographic phenomenon (or the in-plane distribution) results in display non-uniformity. As the injection rate of the liquid crystal material is reduced, the chromatographic phenomenon becomes more significant and the display non-uniformity increases, thereby distracting from the display quality of the LCD device.

(7) According to the technique disclosed in Japanese Laid-Open Publication No. 10-186330 where an axially symmetric orientation fixing layer of a polymer material is provided, a photocurable material is included in addition to a liquid crystal material. Thus, the chromatographic phenomenon is more likely to occur, thereby increasing the display non-uniformity and reducing the display quality of the LCD device.

SUMMARY OF THE INVENTION

According to one aspect of this invention, a liquid crystal display device includes: first and second substrates; a liquid crystal layer interposed between the first and second substrates; a plurality of pillar-like spacers for defining a gap between the first and second substrates; a plurality of electrodes provided on a side of each of the first and second substrates which faces the liquid crystal layer, for applying a voltage through Fly the liquid crystal layer; and a plurality of pixel regions defined by the plurality of electrodes. The liquid crystal layer has liquid crystal molecules having a negative dielectric anisotropy. A vertical alignment layer is provided on a surface of each of the first and second substrates which faces the liquid crystal layer and on surfaces of the pillar-like spacers. The liquid crystal layer includes a plurality of liquid crystal regions defined by the plurality of pillar-like spacers. Each of the pixel regions includes at least one of the liquid crystal regions. The liquid crystal molecules in the liquid crystal regions are aligned substantially perpendicular to the surfaces of the first and second substrates in an absence of an applied voltage and in axial symmetry in a presence of an applied voltage.

In one embodiment of the invention, an axially symmetric orientation fixing layer of a polymer material is provided on at least one of the vertical alignment layers provided on the surfaces of the first and second substrates which face the liquid crystal layer.

In one embodiment of the invention, the pillar-like spacers are provided at least at four positions around each of the pixel regions.

In one embodiment of the invention, the pillar-like spacers are arranged in at least one of point symmetry and line symmetry within each of the pixel regions.

In one embodiment of the invention, the pillar-like spacers are arranged to be in contact with, respectively, four corners or four sides of each of the pixel regions.

In one embodiment of the invention, a cross section of each of the pillar-like spacers along a plane parallel to the surfaces of the first and second substrates is selected from the group consisting of a rectangle, a rectangle with rounded corners, a cross, a T shape, an L shape, a circle and an ellipse.

In one embodiment of the invention, the pillar-like spacers are provided at each corner of, and at least at two substantially equidistantly-divided positions along each side of, each of the pixel regions.

In one embodiment of the invention, a cross section of each of the pillar-like spacers along a plane parallel to the surfaces of the first and second substrates is selected from the group consisting of a rectangle, a rectangle with rounded corners, a circle and a semicircle. A rectangle which circumscribes the pillar-like spacers for each of the pixel regions has a size such that the rectangle can fit within an area defined by ones of the pixel regions adjacent to and surrounding the pixel region. A shorter side or diameter of each of the pillar-like spacers is about 5 $\mu$m or longer.

In one embodiment of the invention, $0.1 \leq y \leq 4.49 e^{-0.0607 ds} + 1.5$, where:

y=D/ds;

D denotes an interval between two adjacent ones of the pillar-like spacers; and ds denotes a length of a shorter side of a rectangular cross section of the pillar-like spacer in a case where the pillar-like spacer has a rectangular cross section, or a diameter of a circular cross section of the pillar-like spacer in a case where the pillar-like spacer has a circular cross section.

In one embodiment of the invention, the pillar-like spacers are arranged to be in contact with, respectively, four sides of each of the pixel regions at respective positions excluding corners of the pixel region.

In one embodiment of the invention, a cross section of each of the pillar-like spacers along a plane parallel to the surfaces of the first and second substrates is selected from the group consisting of a rectangle and a rectangle with rounded corners. A side of each of the pillar-like spacers, which is perpendicular to a side of the pixel region with which the pillar-like spacer is in contact, is about 5 pm or longer and shorter than an interval between two adjacent ones of the pixel regions. Another side of each of the pillar-like spacers, which is parallel to the side of the pixel region with which the pillar-like spacer is in contact, is longer than about 20% and shorter than about 90% of a length of the side of the pixel region.

According to another aspect of this invention, a plasma addressed liquid crystal display device includes: a plasma generation substrate including a first substrate, a dielectric sheet opposing the first substrate, and a plurality of discharge channels arranged in a stripe pattern, each of the discharge channels being defined by the first substrate, the dielectric sheet and one or more partition walls provided between the first substrate and the dielectric sheet; a second substrate opposing the dielectric sheet of the plasma generation substrate with a constant gap therebetween, the second substrate including a plurality of signal electrodes provided on a surface of the second substrate which faces the dielectric sheet, the signal electrodes being arranged in a stripe pattern crossing the stripe pattern of the discharge channels; a liquid crystal layer interposed between the dielectric sheet and the second substrate; a plurality of pillar-like spacers for defining a gap between the dielectric sheet and the second substrate; and a plurality of pixel regions each defined as an area where one of the signal electrodes intersects one of the discharge channels. The liquid crystal layer has liquid crystal molecules having a negative dielectric anisotropy. A vertical alignment layer is provided on a surface of each of the dielectric sheet and the second substrate which faces the liquid crystal layer and on surfaces of the pillar-like spacers. The liquid crystal layer includes a plurality of liquid crystal regions defined by the plurality of pillar-like spacers. Each of the pixel regions includes at least one of the liquid crystal regions. The liquid crystal molecules in the liquid crystal regions are aligned substantially perpendicular to the surfaces of the first and second substrates in an absence of an applied voltage and in axial symmetry in a presence of an applied voltage.

In one embodiment of the invention, an axially symmetric orientation fixing layer of a polymer material is provided on at least one of the vertical alignment layers provided on the surfaces of the dielectric sheet and the second substrate which face the liquid crystal layer.

In one embodiment of the invention, the pillar-like spacers are provided at least at four positions around each of the pixel regions.

In one embodiment of the invention, the pillar-like spacers are arranged in at least one of point symmetry and line symmetry within each of the pixel regions.

In one embodiment of the invention, the pillar-like spacers are arranged to be in contact with, respectively, four corners or four sides of each of the pixel regions.

In one embodiment of the invention, a cross section of each of the pillar-like spacers along a plane parallel to the surfaces of the first and second substrates is selected from the group consisting of a rectangle, a rectangle with rounded corners, a cross, a T shape, an L shape, a circle and an ellipse.

In one embodiment of the invention, the pillar-like spacers are provided at each corner of, and at least at two substantially equidistantly-divided positions along each side of, each of the pixel regions.

In one embodiment of the invention, a cross section of each of the pillar-like spacers along a plane parallel to the surfaces of the first and second substrates is selected from the group consisting of a rectangle, a rectangle with rounded corners, a circle and a semicircle. A rectangle which circumscribes the pillar-like spacers for each of the pixel regions has a size such that the rectangle can fit within an area defined by ones of the pixel regions adjacent to and surrounding the pixel region. A shorter side or diameter of each of the pillar-like spacers is about 5 μm or longer.

In one embodiment of the invention, $0.1 \leq y \leq 4.49e^{-0.0607ds}+1.5$, where:

y=D/ds;

D denotes an interval between two adjacent ones of the pillar-like spacers; and ds denotes one of a length of a shorter side of the pillar-like spacer in a case where the pillar-like spacer has a rectangular cross section and a diameter of the pillar-like spacer in a case where the pillar-like spacer has a circular cross section.

In one embodiment of the invention, the pillar-like spacers are arranged to be in contact with, respectively, four sides of each of the pixel regions at respective positions excluding corners of the pixel region.

In one embodiment of the invention, a cross section of each of the pillar-like spacers along a plane parallel to the surfaces of the first and second substrates is selected from the group consisting of a rectangle and a rectangle with rounded corners. A side of each of the pillar-like spacers, which is perpendicular to a side of the pixel region with which the pillar-like spacer is in contact, is about 5 μm or longer and shorter than an interval between two adjacent ones of the pixel regions. Another side of each of the pillar-like spacers, which is parallel to the side of the pixel region with which the pillar-like spacer is in contact, is longer than about 20% and shorter than about 90% of a length of the side of the pixel region.

A function of the present invention will now be described.

In the present invention, due to the presence of the vertical alignment layer, the liquid crystal molecules in contact with the vertical alignment layer are aligned substantially perpendicularly to the vertical alignment layer. Preferably, the pillar-like spacers are provided at least at four positions around each of the pixel regions. Preferably, the four positions are arranged in point symmetry or line symmetry within each of the pixel regions (e.g., the four positions may correspond to the four corners of each pixel region). The pillar-like spacers in such an arrangement can serve to define the respective pixel regions in each of which the liquid crystal molecules are oriented in axial symmetry, and to maintain a constant cell gap of the liquid crystal cell. Since the pillar-like spacers are provided only partially in each pixel region, the pillar-like spacers will not obstruct the injection of the liquid crystal material into the cell, whereby the injection rate does not have to be reduced. Thus, the chromatographic phenomenon is less likely to occur, thereby reducing the display non-uniformity which occurs due to the chromatographic phenomenon and therefore improving the display quality of the LCD device.

When the axially symmetric orientation fixing layer is provided on at least one of the substrates, it is possible to align the axis of each liquid crystal region (in which the liquid crystal molecules are oriented in axial symmetry by the axially symmetric orientation fixing layer) with a predetermined position, thereby providing a stable axially symmetric orientation. The axially symmetric orientation fixing layer used in the present invention can be formed by injecting a mixture of a liquid crystal material and a photocurable monomer into a liquid crystal cell (e.g., a cell including pillar spacers provided therein), achieving axial symmetry of the liquid crystal molecules by applying a voltage through the cell, and then irradiating the mixture with light to fix the orientation of the molecules.

In the PALCD device of the present invention, since there is a contact area between the pillar-like spacer and the second substrate or the dielectric sheet, it is possible to suppress localization of a stress to the contact area between the dielectric sheet and the pillar-like spacer during production of the cell (e.g., during the step of attaching a pair of substrates together) or injection of the liquid crystal material. Therefore, it is possible to prevent the dielectric sheet from being damaged. Moreover, while the pillar-like spacers are provided at least at four positions around each of the pixel regions, the pillar-like spacers in such an arrangement can serve to define the respective pixel regions in each of which the liquid crystal molecules are oriented in axial symmetry, and to maintain a constant cell gap of the liquid crystal cell. Furthermore, since the pillar-like spacers are provided only partially in each pixel region, the pillar-like spacers will not obstruct the injection of the liquid crystal material into the cell, whereby the injection rate does not have to be reduced. Thus, the chromatographic phenomenon is less likely to occur, thereby reducing the display non-uniformity which occurs due to the chromatographic phenomenon and therefore improving the display quality of the LCD device.

When the axially symmetric orientation fixing layer is provided on at least one of the second substrate and the dielectric sheet, it is possible to align the axis of each liquid crystal region (in which the liquid crystal molecules are oriented in axial symmetry by the axially symmetric orientation fixing layer) with a predetermined position, thereby providing a stable axially symmetric orientation.

In the PALCD device of the present invention, the liquid crystal layer has liquid crystal molecules having a negative dielectric anisotropy, and a vertical alignment layer is provided on a surface of each of the plasma generation substrate and the second substrate which faces the liquid crystal layer. The liquid crystal molecules in the liquid crystal regions are aligned substantially perpendicular to the surfaces of the first and second substrates in the absence of an applied voltage and in axial symmetry in the presence of an applied voltage. Therefore, it is possible to realize a high contrast display having a good viewing angle characteristic where the liquid crystal molecules are oriented in axial symmetry within each of the liquid crystal regions.

The cross section of each pillar-like spacer in the LCD device of the present invention is not limited to any particular shape, and can include a cross, a rectangle, a T shape, an L shape, a circle and an ellipse, as illustrated in FIGS. 21A to 21F, respectively, and any variations thereof. As will be described in the following detailed description of the invention, the pillar-like spacer can be formed through a single patterning step. This eliminates the need for precise alignment as required in a technique employing a plurality of patterning steps, thereby improving the production yield of the device and therefore reducing the production tact time and the production cost of the device.

Thus, the invention described herein makes possible the advantages of providing an LCD device having a good viewing angle characteristic in which the chromatographic phenomenon is less likely to occur, the display quality of the device is improved, and a constant cell gap can be maintained.

These and other advantages of the present invention will become apparent to those skilled in the art upon reading and understanding the following detailed description with reference to the accompanying figures.

BRIEF DESCRIPTION OF THE DRAWINGS

FIG. 1B is a plan view, and FIG. 1A is a cross-sectional view taken along line X–X' in FIG. 1B;

FIGS. 2A and 2B illustrate a state in the absence of an applied voltage, and FIGS. 2C and 2D illustrate a state in the presence of an applied voltage;

FIGS. 3A to 3H are cross-sectional views illustrating respective steps in a method for producing the LCD device illustrated in FIGS. 1A and 1B;

FIG. 4B is a plan view, and FIG. 4A is a cross-sectional view taken along line Y–Y' in FIG. 4B;

FIG. 17 is a graph showing evaluation results for axial symmetry percentages of various LCD devices. The horizontal axis represents a value ds denoting a length of a side of the pillar-like spacer in the case where the pillar-like spacer has a rectangular cross section (or a diameter of the pillar-like spacer in a case where the pillar-like spacer has a circular cross section). The vertical axis represents a value y (=D/ds), where D denotes the interval between two adjacent pillar-like spacers;

FIG. 19 is a schematic cross-sectional view illustrating a PALCD device according to Embodiment 2 of the present invention;

FIGS. 20A to 20C are each a schematic plan view illustrating the positional relationship between the pillar-like spacers and the partition walls in the PALCD device according to Embodiment 2 of the present invention;

FIG. 22B is a plan view, and FIG. 22A is a cross-sectional view taken along line Z–Z' in FIG. 22B;

FIG. 24A is a cross-sectional view, and FIG. 24B is a plan view thereof; FIG. 25A is a cross-sectional view, and FIG. 25B is a plan view thereof.

DESCRIPTION OF THE PREFERRED EMBODIMENTS

The present invention will now be described by way of illustrative examples with reference to the accompanying figures.

The "axially symmetric orientation" as used herein refers to an orientation of liquid crystal molecules, including a spiral orientation, a concentric (tangential) orientation, a radial orientation, and the like. In an exemplary axially symmetric orientation, the liquid crystal molecules may be oriented in a spiral orientation on one substrate and in a reverse spiral orientation on the other substrate. In another exemplary axially symmetric orientation, two or more, same or different, orientations (e.g., the concentric orientation and the radial orientation) may be provided in combination so that the orientation on one substrate is perpendicular to the orientation on the other substrate. In still another exemplary orientation, the liquid crystal molecules may be oriented in four different directions in each micro region but in an omniazimuth orientation in a macroscopic sense.

The term "pixel" is typically defined as the minimum unit for producing a display. In this specification, the term "pixel region" refers to a region or portion of a liquid crystal display device which corresponds to a "pixel". When a pixel, or a pixel region, has a large aspect ratio (known as a "long pixel"), a plurality of liquid crystal regions may be formed within one such long pixel, or pixel region. It is preferable that the number of pixel regions provided for each pixel is as small as possible so that the axially symmetric orientation can be formed stably.

Embodiment 1

Figure 1A:
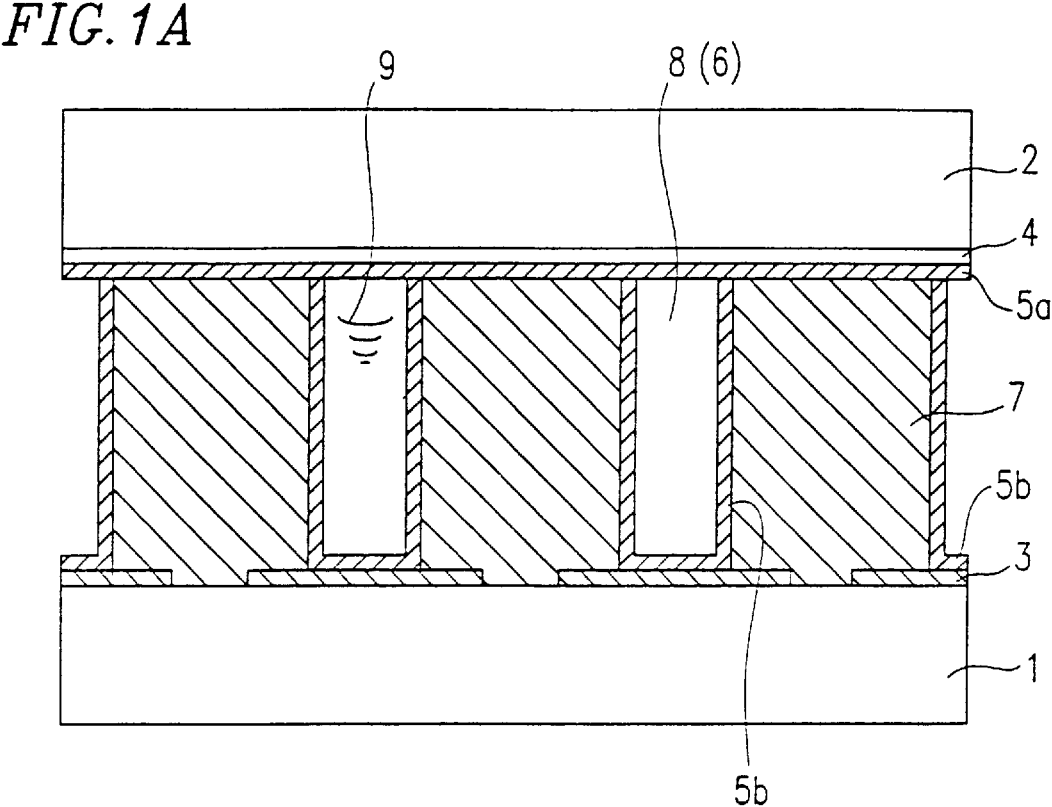
FIGS. 1A and 1B schematically illustrate an exemplary arrangement of an LCD device according to Embodiment 1 of the present invention, where
Figure 1B:
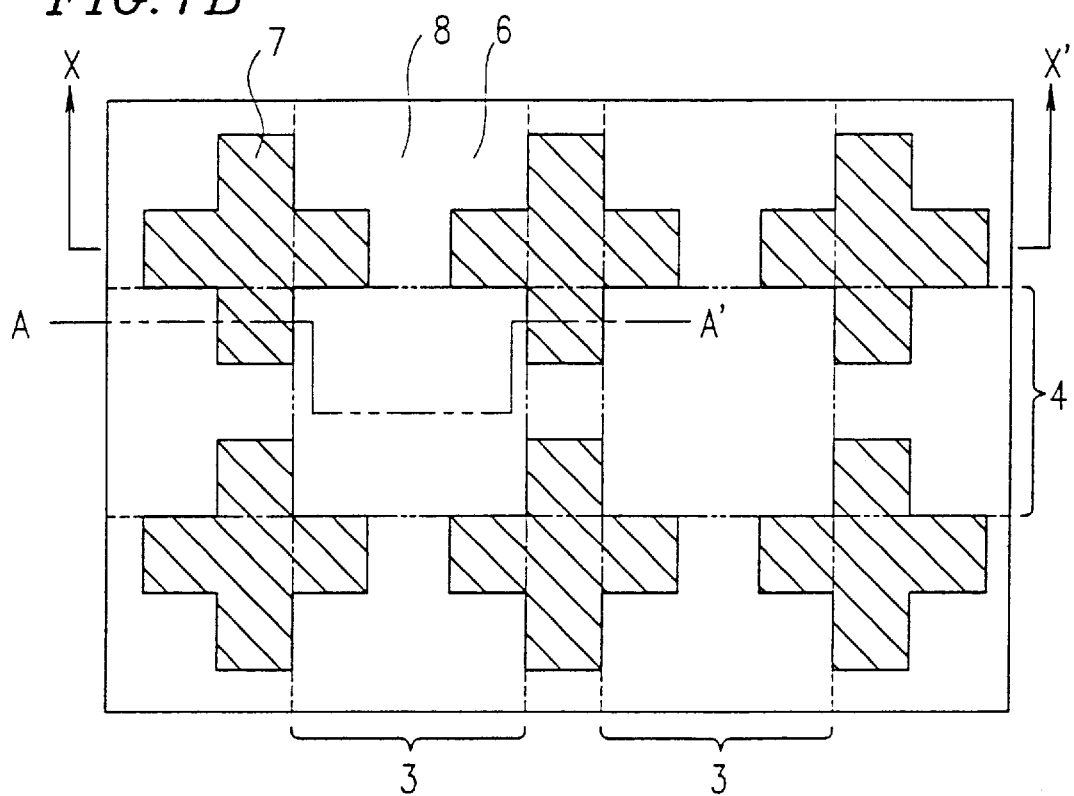

FIGS. 1A and 1B are schematic views illustrating an exemplary arrangement of an LCD device according to one embodiment of the present invention. FIG. 1B is a plan view illustrating the exemplary arrangement, and FIG. 1A is a cross-sectional view taken along line X–X' in FIG. 1B.

The LCD device includes a pair of substrates, e.g., glass substrates 1 and 2 with a liquid crystal layer 9 interposed therebetween. A sealing member (not shown) is provided around the substrates 1 and 2 for sealing the liquid crystal layer 9. Pillar-like spacers 7 are provided at predetermined positions in the liquid crystal layer 9 between the substrates 1 and 2.

A stripe pattern of signal electrodes 4 (e.g., made from a transparent electrode film of ITO) is provided on the inner surface of the glass substrate 2 which faces the liquid crystal layer 9. A vertical alignment layer 5a of a polyimide, or the like, is on the substrate 2 and is provided to substantially cover the stripe pattern of the signal electrodes 4.

A color filter (not shown) and a black matrix (not shown) are provided on the inner surface of the glass substrate 1 which faces the liquid crystal layer 9. A stripe pattern of signal electrodes 3 (e.g., made from a transparent conductive film of ITO) is provided on the color filter (not shown) and the black matrix (not shown) so as to cross the stripe pattern of the signal electrodes 4. Pixel regions 6 are each defined as an area where one of the signal electrodes 3 intersects one of the signal electrodes 4. For each pixel region 6, one (or more) liquid crystal region 8 may be provided. In this example, one liquid crystal region 8 is formed for each pixel region 6. The color filter (not shown) includes R, G and B colored portions for each pixel region 6, and the black matrix (not shown) is provided to cover intervals between the colored portions of the color filter. The pillar-like spacers 7 are provided at the four corners of the liquid crystal region 8. A vertical alignment layer 5b of a polyimide, or the like, is provided on the inner surface of the substrate 1, and more specifically, on a side surface of the pillar-like spacer 7 and a portion of the electrode 3 where there is no pillar-like spacer 7. Alternatively, the vertical alignment layer 5b may also be provided on an upper surface of the pillar-like spacer 7 (i.e., between the upper surface of the pillar-like spacer and the vertical alignment layer 5a).

Figure 2B:
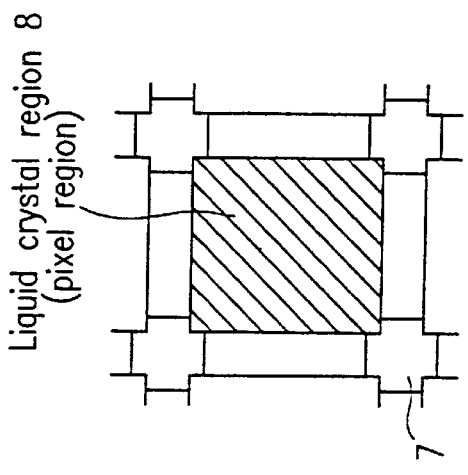
Figure 2D:
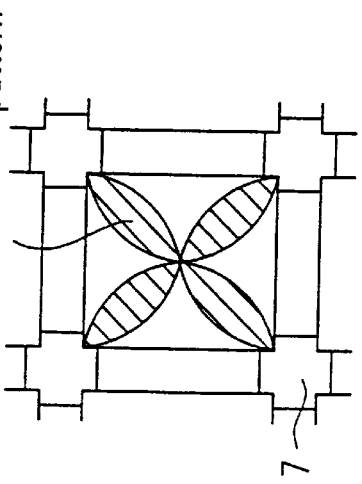
Figure 2A:
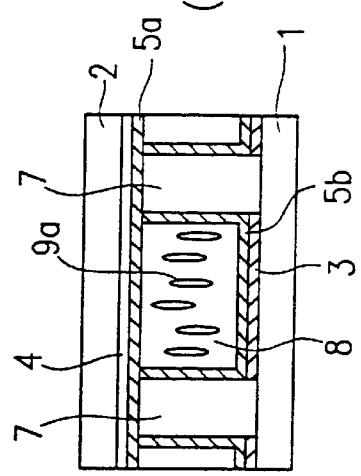
FIGS. 2A and 2C each illustrate a cross-sectional view of the liquid crystal display device, and FIGS. 2B and 2D each illustrate how the upper surface of the device is observed with a polarization microscope in a crossed Nicols state, where
Figure 2C:
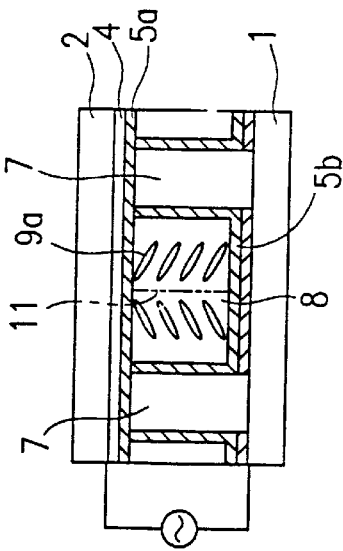

Referring to FIGS. 2A to 2D, the operation principle of the LCD device of the present invention will be described. FIGS. 2A and 2C each illustrate a cross-sectional view of the liquid crystal display device, and FIGS. 2B and 2D each illustrate how the upper surface of the device is observed with a polarization microscope in a crossed Nicols state. FIGS. 2A and 2B illustrate a state in the absence of an applied voltage, and FIGS. 2C and 2D illustrate a state in the presence of an applied voltage. In FIG. 2B or 2D, one pixel region includes only one liquid crystal region. However, one pixel region may alternatively include two or more liquid crystal regions therein. In FIGS. 1A, 1B and 2A to 2D, like reference numerals denote like elements.

In the absence of an applied voltage, as illustrated in FIG. 2A, liquid crystal molecules 9a are aligned in a direction substantially perpendicular to the substrates 1 and 2 by the anchoring force of the vertical alignment layers 5a and 5b. When observed by a polarization microscope in a crossed Nicols state, a liquid crystal region 8 in the absence of an applied voltage exhibits a dark field (normally black mode), as illustrated in FIG. 2B.

When a voltage is applied through the liquid crystal display device, a force acts upon the liquid crystal molecules 9a having a negative dielectric anisotropy and orients the molecules 9a so that the long axis of the molecules 9a is perpendicular to the direction of the electric field. As a result, the molecules 9a incline from a direction substantially perpendicular to the substrate, as illustrated in FIG. 2C (gray-level display state). When observed by a polarization microscope in a crossed Nicols state, the liquid crystal region 8 in this state exhibits an extinction pattern along a direction inclined about 45° from the polarization axis, as illustrated in FIG. 2D.

Immediately after the application of a voltage, the direction in which a majority of the liquid crystal molecules 9a incline is not uniquely determined. As a result, there is a transitional state where a plurality of liquid crystal domains (a region across which the orientation of the liquid crystal molecules 9a is continuous with substantially no disclination line) exist. In each liquid crystal domain, the liquid crystal molecules 9a are oriented in axial symmetry about an axially symmetric orientation central axis. After a continued voltage application, the plurality of liquid crystal domains are fused into a single domain, where the liquid crystal molecules 9a in the liquid crystal region 8 are oriented in axial symmetry about a single axially symmetric orientation central axis. FIG. 2C illustrates the liquid crystal molecules 9a oriented in axial symmetry about an axially symmetric orientation central axis 11 when a gray-level display voltage is applied through the LCD device.

(Pillar-like spacers defining liquid crystal region)

The LCD device of the present invention includes a plurality of pillar-like spacers 7 provided around the liquid crystal region 8. When the pillar-like spacers 7 are not provided, and thus there is no factor to regulate the orientation of the liquid crystal molecules 9a in the presence of an applied voltage, the direction in which the liquid crystal molecules 9a incline is not uniquely determined. As a result, the location or size of the liquid crystal domain (a region across which the orientation of the liquid crystal molecules 9a is continuous with substantially no disclination line) is not determined, thereby resulting in a random orientation. In such a case, the gray-level display of the LCD device will be rough or non-uniform.

By providing the pillar-like spacer 7, the location and size of the liquid crystal region 8 (which exhibits axially symmetric orientation) are defined. The pillar-like spacer 7 is provided to regulate the orientation of the liquid crystal molecules 9a in the presence of an applied voltage. Due to the vertical alignment layer 5b provided on the side surface of the pillar-like spacer 7, in the presence of an applied voltage, the liquid crystal molecules 9a incline in a direction substantially perpendicular to the side surface of the pillar-like spacer 7 in the vicinity of the pillar-like spacer 7. Then, other liquid crystal molecules 9a near the inclined liquid crystal molecules 9a also incline in substantially the same direction. In other words, the liquid crystal molecules 9a tend to take an orientation such that the directors of the adjacent liquid crystal molecules 9a (directions along the long axes of the molecules 9a) are as continuous as possible. The liquid crystal molecules 9a farther away from the pillar-like spacer 7 (the orientation regulating factor) are less likely to be influenced by the anchoring force of the pillar-like spacer 7.

Therefore, immediately after the application of a voltage, the direction in which the liquid crystal molecules 9a incline is not uniquely determined, whereby a disclination line occurs, where the directors of the liquid crystal molecules 9a are not continuous in a single liquid crystal region 8. Thus, there is a transitional state where a plurality of liquid crystal domains exist. After a continued voltage application, along the disclination line, or a boundary between two adjacent liquid crystal domains (where the directors of the liquid crystal molecules 9a are not continuous), the orientation of the liquid crystal molecules 9a is changed by an external field (e.g., an electric field) to a more stable orientation where the directors of the adjacent liquid crystal molecules 9a are more continuous. After a continued voltage application for a certain period of time, the plurality of liquid crystal domains are fused into a single domain, where the liquid crystal molecules 9a in the liquid crystal region 8 are finally oriented in axial symmetry about the single axially symmetric orientation central axis 11.

The orientation of the liquid crystal molecules 9a in the presence of an applied voltage is influenced by the cross-sectional shape and the arrangement of the pillar-like spacer 7. The direction of a side of the cross section of the pillar-like spacer 7 influences the direction in which the liquid crystal molecules 9a are oriented from the direction substantially perpendicular to the substrates 1 and 2 in the absence of an applied voltage. Due to the vertical alignment layer 5b provided on the side surface of the pillar-like spacer 7, in the presence of an applied voltage, the liquid crystal molecules 9a incline in a direction substantially perpendicular to the side surface of the pillar-like spacer 7 in the vicinity of the pillar-like spacer 7. Preferably, the cross section of the pillar-like spacer 7 has a linear shape such as a cross, a rectangle, a T shape, an L shape, or the like. As well as the linear shapes, the cross section of the pillar-like spacer 7 can also include a circle, an ellipse, or the like.

The arrangement of the pillar-like spacers 7 defines the location and size of the liquid crystal region 8 and influences whether the liquid crystal molecules 9a in the liquid crystal region 8 would exhibit an axially symmetric orientation in the presence of an applied voltage. For defining the location and size of the liquid crystal region 8, the pillar-like spacers are preferably provided at least at four positions around each of the pixel regions. Preferably, the four positions are arranged in point symmetry or line symmetry within each of the pixel regions (e.g., the four positions may correspond to the four corners of each pixel region). One side of the cross section of the pillar-like spacer 7 may be in contact with any one of four sides of the liquid crystal region 8. When the cross section of the pillar-like spacer 7 is curved, the pillar-like spacer 7 may be positioned so that an external tangent of the curve is substantially aligned with any one of four sides of the liquid crystal region 8. The pillar-like spacer 7 having a rectangular cross section can be preferably positioned to be in contact with any one of four sides of the liquid crystal region 8 so that the long side of the rectangular cross section is parallel to the one of four sides of the liquid crystal region 8.

EXAMPLES

Examples of the present invention will now be described, but the present invention is not limited thereto.

Example 1

Referring to FIGS. 3A to 3H, a method for producing an LCD device according to Embodiment 1 of the present invention will now be described.

FIGS. 3A to 3H are cross-sectional views illustrating respective steps in the method for producing the LCD device.

In step 3A, a color filter (not shown) including R, G and B colored portions for each pixel region and a black matrix (not shown) covering intervals between the colored portions are formed on one surface of the glass substrate 1. A signal electrode 3 is formed on the color filter and the black matrix.

In step 3B, the pillar-like spacers 7 are formed on the black matrix (not shown) on the glass substrate 1. The pillar-like spacers 7 are formed by, for example, applying a photosensitive resin (such as a resist) on the substrate, and patterning the photosensitive resin via a photomask. Thus, the pillar-like spacer 7 can be formed in a single patterning step. This eliminates the need for precise alignment as required in a method involving a plurality of patterning steps, thereby improving the production yield of the device and reducing the production tact time and the production cost of the device.

In step 3C, the vertical alignment layer 5b is formed on the glass substrate 1, on which the pillar-like spacers 7 have been formed.

In step 3D, a signal electrode 4 is formed on one surface of the other glass substrate 2.

In step 3E, the vertical alignment layer 5a is formed on the glass substrate 2, on which the signal electrode 4 has been formed.

In step 3F, the glass substrates 1 and 2 are attached together.

In step 3G, a liquid crystal layer (the liquid crystal region) 8 is formed by injecting a liquid crystal material into the gap between the glass substrates 1 and 2.

Thus, in the LCD device produced as described above, due to the vertical alignment layers 5a and 5b, some of the liquid crystal molecules 9, which are adjacent to the vertical alignment layers 5a and 5b, are oriented in a direction substantially perpendicular to the vertical alignment layers 5a and 5b. Since the pillar-like spacers 7 are arranged at the corners of each liquid crystal region for each pixel region in the liquid crystal layer 8, the pillar-like spacers 7 can define respective liquid crystal regions in each of which the liquid crystal molecules 9 are oriented in axial symmetry. The pillar-like spacers 7 also serve to maintain the cell gap of the liquid crystal cell. Moreover, since the pillar-like spacers 7 are arranged at the corners of each liquid crystal region for each pixel region, the pillar-like spacers 7 do not obstruct the injection of the liquid crystal material into the cell, whereby the injection rate does not have to be reduced. Thus, the chromatographic phenomenon is less likely to occur, thereby reducing the display non-uniformity which occurs due to the chromatographic phenomenon and therefore improving the display quality of the LCD device.

Example 2

Figure 4A:
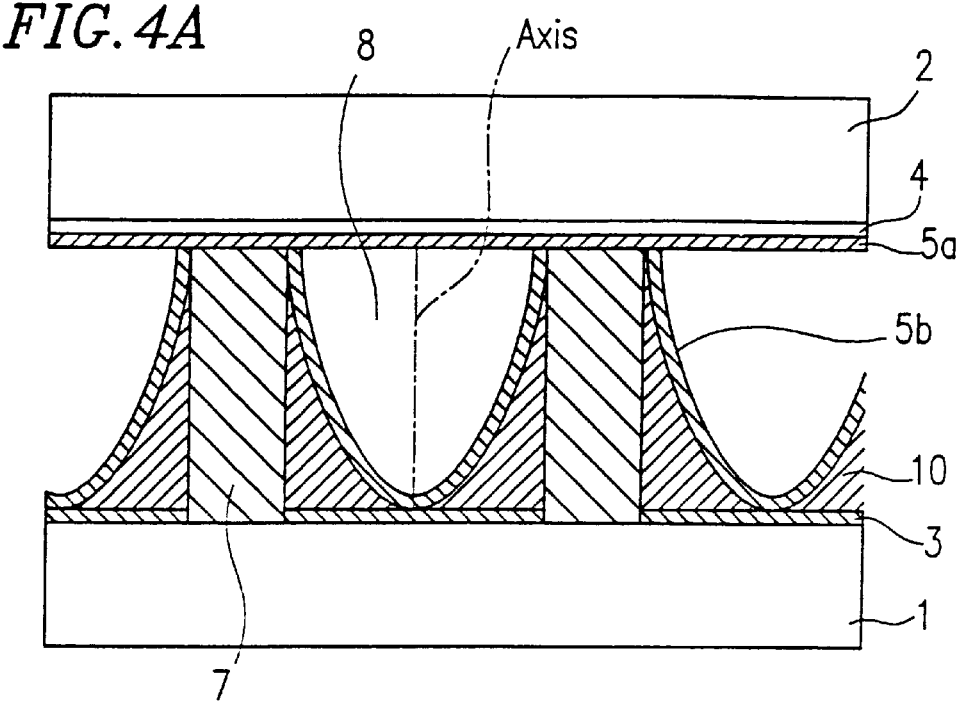
FIGS. 4A and 4B schematically illustrate another exemplary arrangement of an LCD device according to Embodiment 1 of the present invention, where
Figure 4B:
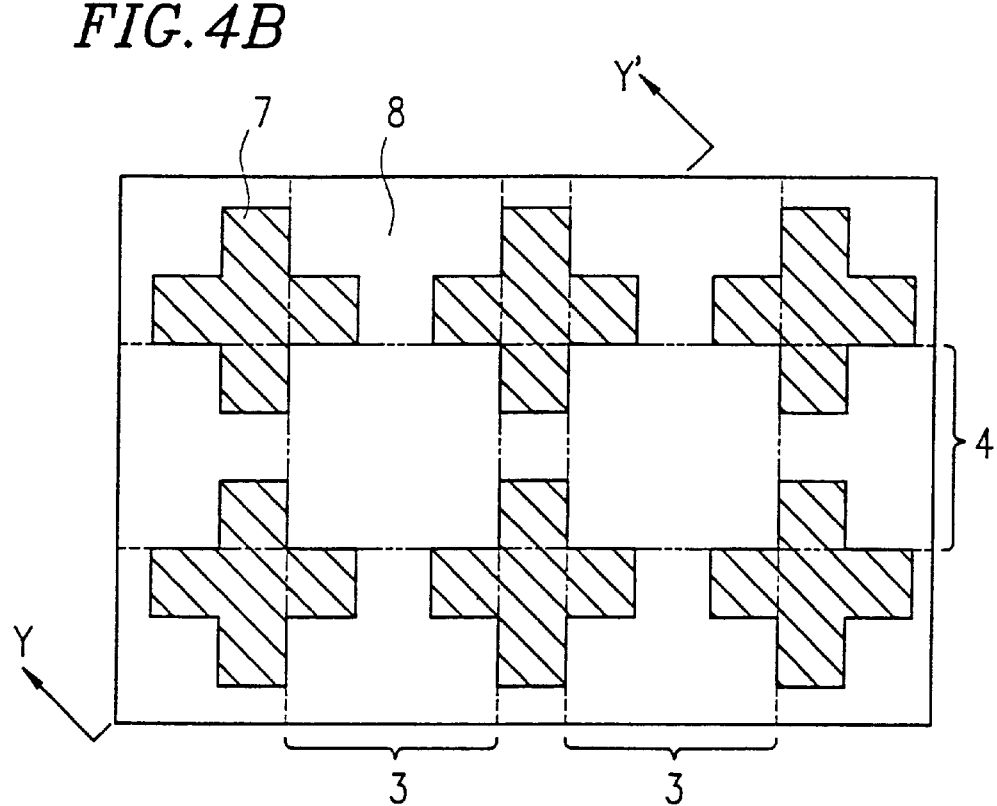
Figure 5:
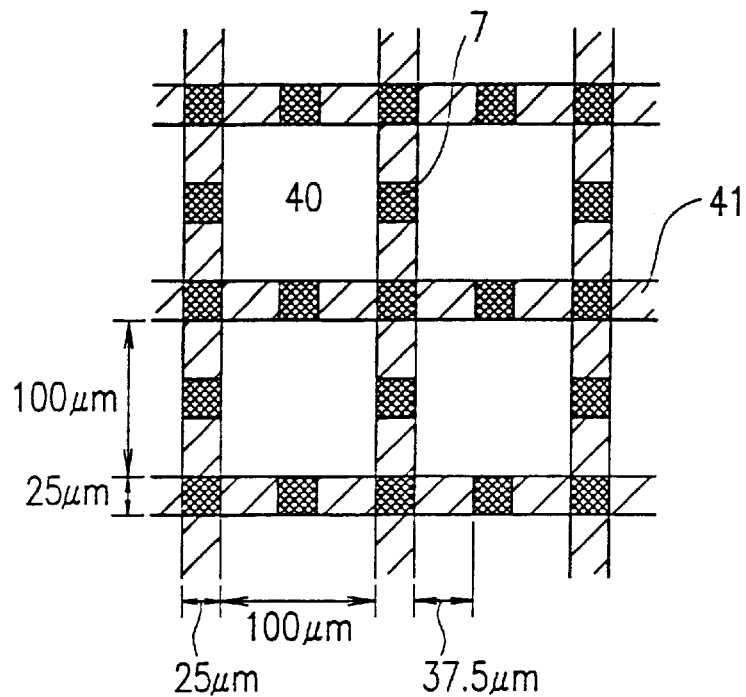
FIG. 5 is a schematic view illustrating an exemplary arrangement of pillar-like spacers in a liquid crystal cell produced according to Example 3 of the present invention.

FIGS. 4A and 4B illustrate an LCD device according to Example 2 of the present invention. FIG. 4B is a plan view illustrating the LCD device, and FIG. 4A is a cross-sectional view taken along line Y–Y' in FIG. 4B.

In the LCD device illustrated in FIGS. 4A and 4B, an axially symmetric orientation fixing layer 10 is provided on the substrate 1 for each pixel region, i.e., within each liquid crystal region 8. The vertical alignment layer 5b is provided on the axially symmetric orientation fixing layer 10.

Referring to FIG. 4A, the thickness of the axially symmetric orientation fixing layer 10 varies gradually from its maximum value at the pillar-like spacers 7, and decreases as the distance from the pillar-like spacer 7 increases to reach the minimum value at the central axis between two adjacent pillar-like spacers 7. The thickness increases again as the distance to the next pillar-like spacer 7 decreases. Thus, the lowest portion of the axially symmetric orientation fixing layer 10 corresponds to the center of each pixel. In other words, the axis for the axially symmetric orientation in each liquid crystal region 8 corresponds to the lowest portion of the axially symmetric orientation fixing layer 10.

Thus, in the LCD device illustrated in FIGS. 4A and 4B, it is possible to control the positioning of the axis of the axially symmetric orientation to a predetermined position of the axially symmetric orientation fixing layer 10.

Passive matrix type LCD devices, as illustrated in FIGS. 1A, 1B, 4A and 4B, have been described above, where each pixel is defined as an intersection between one of the signal electrodes in a stripe arrangement on one substrate and one of the signal electrodes in a stripe arrangement on the other substrate. However, the present invention is not limited thereto, and can also be applied to an active matrix LCD device, which includes, on one of a pair of substrates, a plurality of switching elements such as thin film transistors (TFTs), two types of signal electrodes respectively for transmitting gate signals and source signals to the switching elements, and a plurality of pixel electrodes arranged in a matrix which are driven by the signals transmitted via the switching elements. A counter electrode is provided to substantially cover the entire surface of the other substrate.

In Examples 3 to 10 below, alternative cross-sectional shapes and arrangements of the pillar-like spacers according to Embodiment 1 of the present invention will be illustrated.

Example 3

Referring again to FIGS. 3A to 3H, the transparent signal electrodes 3 and 4 each having a thickness of about 100 nm are formed on the glass substrates 1 and 2 (e.g., 7059: from Corning Inc.). JCR BLACK 535 (from Japan Synthetic Rubber Co., Ltd.) is spin-coated on the ITO film 3 so as to be about 4.5 $\mu$m in thickness, and heated for about 5 minutes at about 80° C. on a hot plate. The resultant structure is subjected to contact exposure for about 40 seconds using a mask. The mask used in the present example is such that the pillar-like spacers 7 (each having a cross section of about 25 $\mu$m by 25 $\mu$m) are provided at the four corners of each liquid crystal region (about 100 $\mu$m by about 100 $\mu$m in size) and at respective points which substantially equidistantly bisect the sides of the liquid crystal region. The illumination in the exposure step is about 10 mW/cm² at about 365 nm. The exposed structure is developed for about 60 seconds with a special developing solution (e.g., CD-200CR) (about 50×dilution, about 25° C.), rinsed for about 60 seconds in a pure water shower, and post-baked for about 30 minutes in a circulation oven at about 220° C., thus forming the pillar-like spacers 7.

A vertical alignment film (e.g., JALS-204: from Japan Synthetic Rubber Co., Ltd.) is applied on a side of each substrate on which the ITO film has been formed to be about 80 nm, and post-baked for about one hour at about 180° C., thus forming the alignment film layers 5a and 5b. Then, the substrates 1 and 2 are attached together via a sealing agent, thereby producing a liquid crystal cell.

Figure 6:
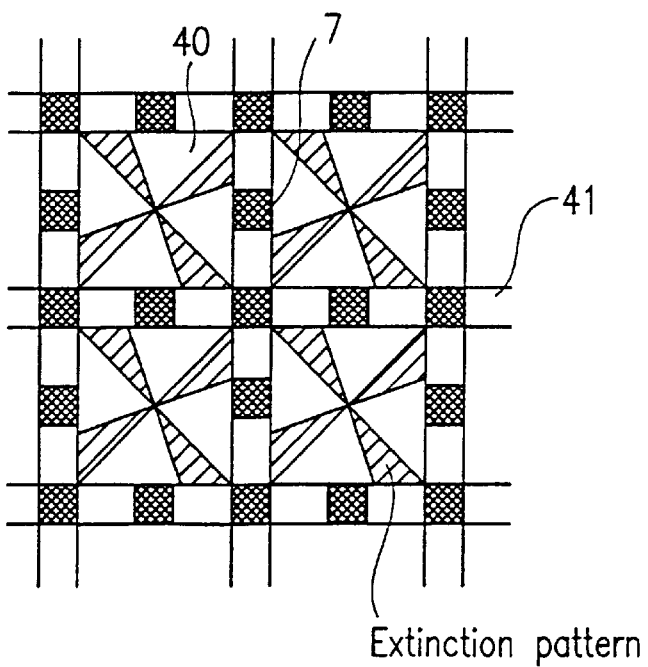
FIG. 6 is a schematic view illustrating how the liquid crystal cell of FIG. 5 is observed in use.

A liquid crystal material having a negative dielectric anisotropy ($\Delta\epsilon$=about −4.0, $\Delta$n=about 0.08, with a chiral agent added to have an about 90° twist within a cell gap of about 4.5 $\mu$m) is injected into the produced liquid crystal cell. When the resultant structure was observed by a polarization microscope in a crossed Nicols state in the presence of an applied voltage between the substrates 1 and 2, an extinction pattern was observed extending from the center of the liquid crystal region toward the respective sides thereof, as illustrated in FIG. 6. Thus, the liquid crystal molecules were oriented in axial symmetry.

Example 4

Figure 7:
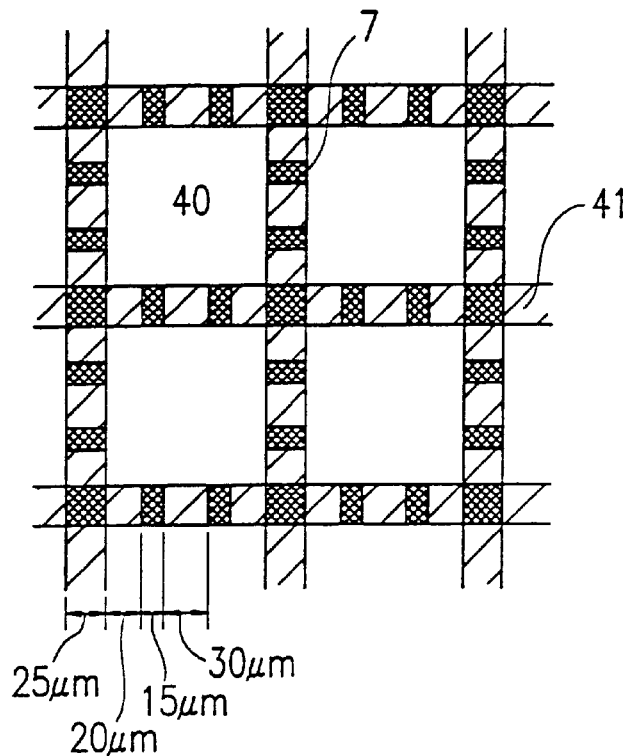
FIG. 7 is a schematic view illustrating an exemplary arrangement of pillar-like spacers in a liquid crystal cell produced according to Example 4 of the present invention.
Figure 8:
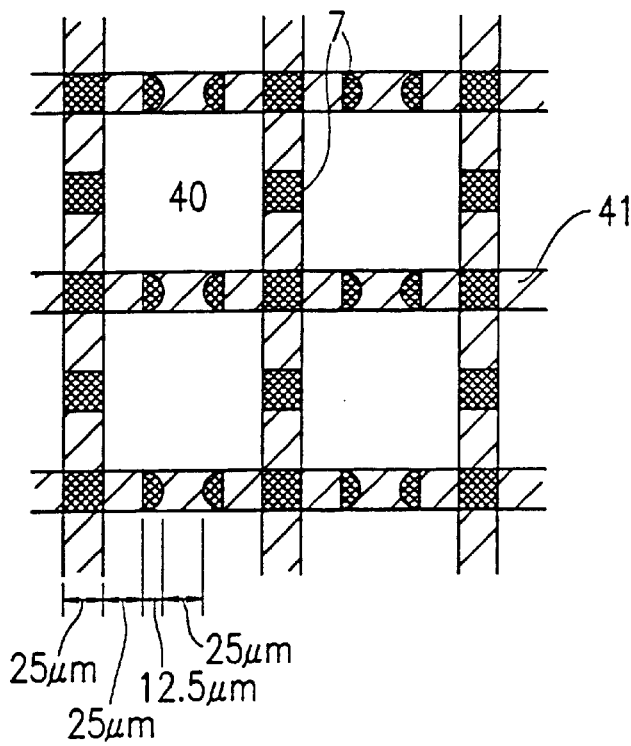
FIG. 8 is a schematic view illustrating another exemplary arrangement of pillar-like spacers in a liquid crystal cell produced according to Example 4 of the present invention.
Figure 9:
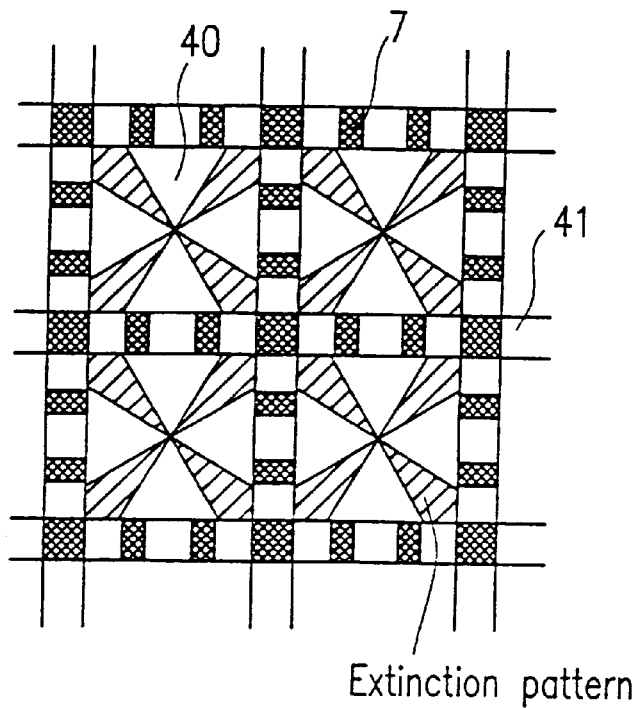
FIG. 9 is a schematic view illustrating how the liquid crystal cell of FIG. 7 is observed in use.
Figure 10:
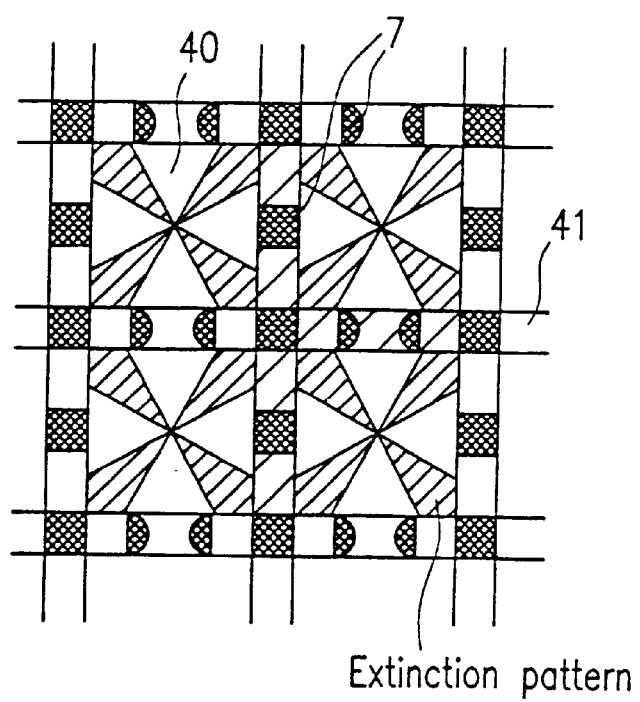
FIG. 10 is a schematic view illustrating how the liquid crystal cell of FIG. 8 is observed in use.

JCR BLACK 535 (from Japan Synthetic Rubber Co., Ltd.) is spin-coated on the glass substrates so as to be about 6 $\mu$m in thickness, and heated for about 5 minutes at about 80° C. on a hot plate, as in Example 3. The resultant structure is subjected to exposure using a mask, development and baking, as in Example 3. The mask used in the present example is such that the pillar-like spacers 7 are provided at the four corners of each liquid crystal region (about 100 $\mu$m by about 100 $\mu$m in size) and at respective points which substantially equidistantly bisect the sides of the liquid crystal region and/or at respective points which substantially equidistantly trisect the sides of the liquid crystal region, as illustrated in FIGS. 7 and 8. The subsequent processes are performed as in Example 3, thus forming the pillar-like spacers 7. When the resultant structure was observed by a polarization microscope in a crossed Nicols state in the presence of an applied voltage between the substrates 1 and 2, an extinction pattern was observed extending from the center of the liquid crystal region toward the respective sides thereof, as illustrated in FIGS. 9 and 10. Thus, the liquid crystal molecules were oriented in axial symmetry.

Example 5

Figure 11:
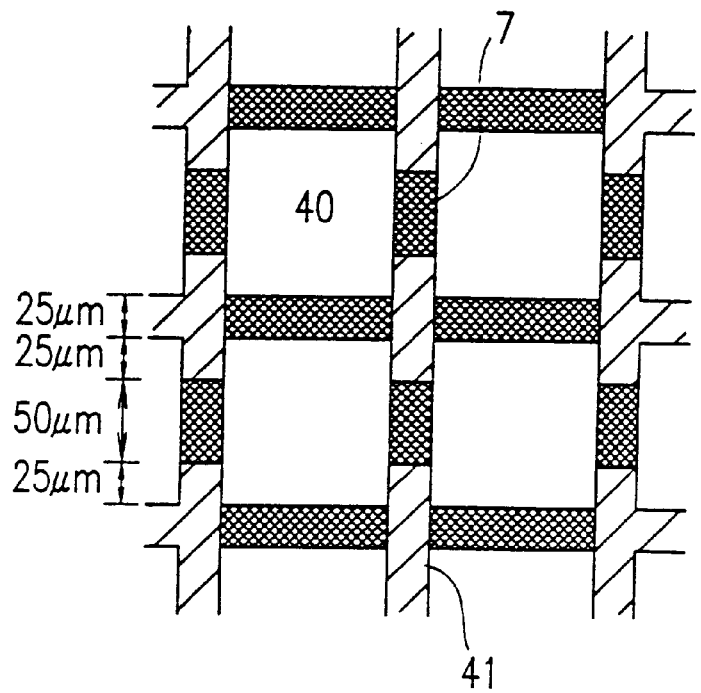
FIG. 11 is a schematic view illustrating another exemplary arrangement of pillar-like spacers in a liquid crystal cell produced according to Example 5 of the present invention.
Figure 12:
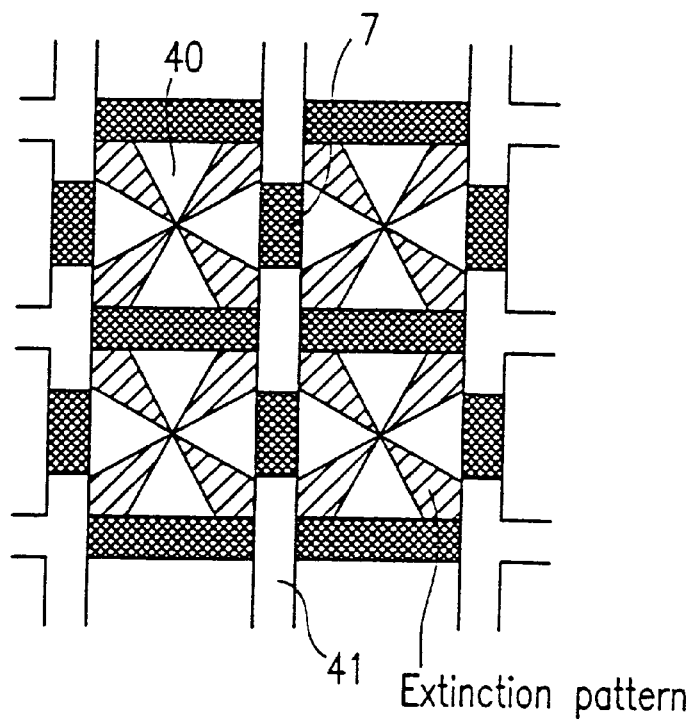
FIG. 12 is a schematic view illustrating how the liquid crystal cell of FIG. 11 is observed in use.

JCR BLACK 535 (from Japan Synthetic Rubber Co., Ltd.) is spin-coated on the glass substrates so as to be about 6 $\mu$m in thickness, and heated for about 5 minutes at about 80° C. on a hot plate, as in Example 3. The resultant structure is subjected to exposure using a mask, development and baking, as in Example 3. The mask used in the present example is such that the pillar-like spacers 7 are provided along the respective sides of each liquid crystal region 40 (about 100 $\mu$m by about 100 $\mu$m in size) with no pillar-like spacer being provided at the corners thereof, as illustrated in FIG. 11. The subsequent processes are performed as in Example 3, thus forming the pillar-like spacers 7. When the resultant structure was observed by a polarization microscope in a crossed Nicols state in the presence of an applied voltage between the substrates 1 and 2, an extinction pattern was observed extending from the center of the liquid crystal region 40 toward the respective sides thereof, as illustrated in FIG. 12. Thus, the liquid crystal molecules were oriented in axial symmetry.

Example 6

Figure 13:
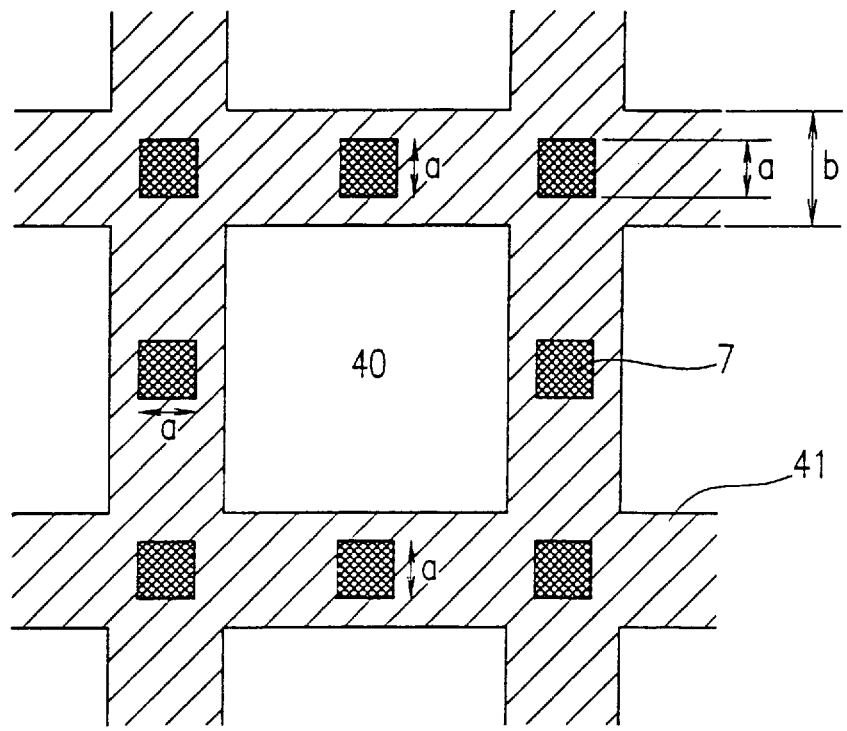
FIG. 13 is a schematic view illustrating another exemplary arrangement of pillar-like spacers in a liquid crystal cell produced according to Example 6 of the present invention.

The transparent signal electrode 3 of ITO having a thickness of about 100 nm is formed on the glass substrate 1 (e.g., 7059: from Corning Inc.). V259-PA (from Nippon Chemical Steel Co., Ltd.) is spin-coated on the transparent signal electrode 3 so as to be about 5 $\mu$m in thickness, heated for about 3 minutes at about 100° C. on a hot plate, and further heated for about 10 minutes in a circulation oven at about 80° C. The resultant structure is subjected to contact exposure for about 120 seconds using a mask. The mask used in the present example is such that the pillar-like spacers 7 are provided at the four corners of each liquid crystal region 40 (about 100 $\mu$m by about 100 $\mu$m in size) and at respective points which substantially equidistantly bisect the sides of the liquid crystal region 40. Each pillar-like spacer 7 in the present example has a length of "a", as illustrated in FIG. 13. More specifically, a pillar-like spacer 7 positioned intermediate two corner pillar-like spacers 7 has the length "a" in a direction perpendicular to a length of an adjacent side of the liquid crystal region 40, and a pillar-like spacer 7 at the corner of the liquid crystal region 40 has the length "a" in two directions perpendicular to two adjacent sides of the liquid crystal region 40, respectively.

The illumination in the exposure step is about 10 mW/cm² at about 365 nm. The exposed structure is developed with 0.4%-$K_2CO_3$.aq for about 150 seconds, rinsed for about 120 seconds in a pure water shower, and post-baked for about one hour in a circulation oven at about 240° C., thus forming the pillar-like spacers 7. A vertical alignment film (e.g., JALS-204: from Japan Synthetic Rubber Co., Ltd.) is applied on a side of each substrate on which the ITO film has been formed to be about 80 nm in thickness, and post-baked for about one hour at about 180° C., thus forming the alignment film layer 5a.

The vertical alignment film (e.g., JALS-204: from Japan Synthetic Rubber Co., Ltd.) is applied also on a side of the substrate 2 on which the transparent signal electrode 4 of ITO has been formed with a thickness of about 100 nm, thus forming the alignment film layer 5b. Then, the glass substrates 1 and 2 are attached together via a sealing agent, thereby producing a liquid crystal cell.

A liquid crystal material having a negative dielectric anisotropy ($\Delta\epsilon$=about −4.0, $\Delta n$=about 0.08, with a chiral agent added to have an about 90° twist within a cell gap of about 5 µm) is injected into the produced liquid crystal cell. The resultant structure was observed by a polarization microscope in a crossed Nicols state.

When the length "a" is greater than a line width b of the black matrix, the pillar-like spacer 7 extends beyond the black matrix and into the liquid crystal region 40, thereby reducing the aperture ratio of the device. When the length "a" is sufficiently large, the liquid crystal molecules are oriented in axial symmetry within each liquid crystal region in the presence of an applied voltage. However, when the length "a" is less than about 5 µm, the axially symmetric orientation is not obtained in the presence of an applied voltage.

In the present example, the cross section of the pillar-like spacer 7 need not be perfectly rectangular. For example, the cross section may alternatively be a rectangle with rounded corners. This applies to all the cross sections shown in the examples of the present invention. Thus, the effect of the present invention can be achieved even when the cross section is slightly deformed due to a poor process precision in a photolithography process, or the like.

Example 7

Figure 14:
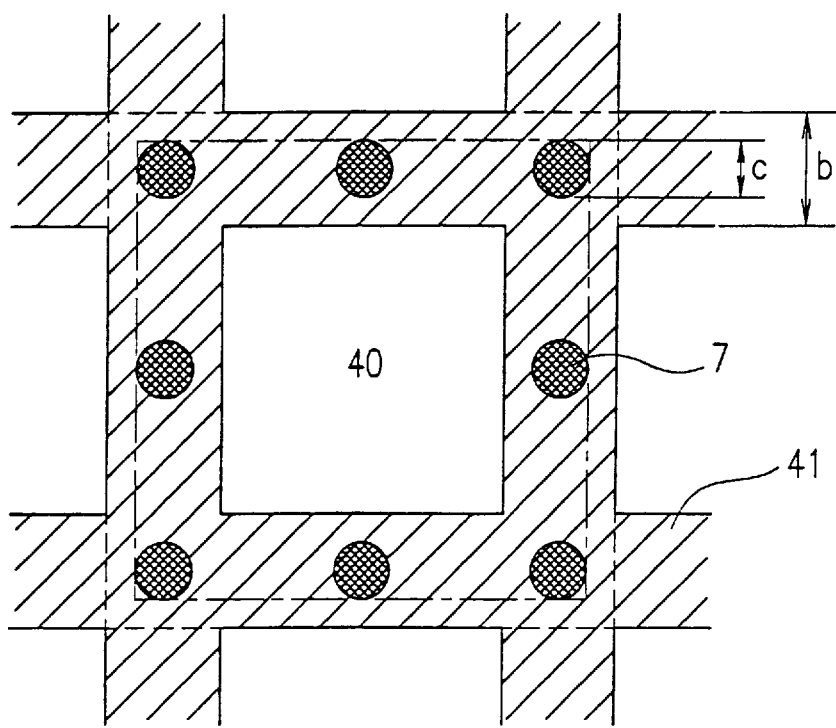
FIG. 14 is a schematic view illustrating another exemplary arrangement of pillar-like spacers in a liquid crystal cell produced according to Example 7 of the present invention.

The transparent signal electrode 3 of ITO having a thickness of about 100 nm is formed on the glass substrate 1 (e.g., 7059: from Corning Inc.). V259-PA (from Nippon Chemical Steel Co., Ltd.) is spin-coated on the transparent signal electrode 3 so as to be about 5 µm in thickness, heated for about 3 minutes at about 100° C. on a hot plate, and further heated for about 10 minutes in a circulation oven at about 80° C. The resultant structure is subjected to exposure using a mask, development and baking, as in Example 6. The mask used in the present example is such that circular pillar-like spacers 7 are provided at the four corners of each liquid crystal region 40 (about 100 µm by about 100 µm in size) and at respective points which substantially equidistantly bisect the sides of the liquid crystal region 40, with each pillar-like spacer 7 having a diameter of c, as illustrated in FIG. 14. The subsequent processes are performed as in Example 6, thus forming the pillar-like spacers 7. Then, the glass substrates 1 and 2 are attached together, thereby producing a liquid crystal cell.

A liquid crystal material having a negative dielectric anisotropy ($\Delta\epsilon$=about −4.0, $\Delta n$=about 0.08, with a chiral agent added to have an about 90° twist within a cell gap of about 5 µm) is injected into the produced liquid crystal cell. The resultant structure was observed by a polarization microscope in a crossed Nicols state.

When the diameter c of the circular pillar-like spacer 7 is greater than the line width b of the black matrix (i.e., c>b), the pillar-like spacer 7 extends beyond the black matrix, thereby reducing the aperture ratio of the device. In other words, a rectangle which circumscribes the pillar-like spacers 7 for each of the pixel regions 40 has a size such that the rectangle (shown by a single dot chain in FIG. 14) can fit within an area defined by ones of the pixel regions (shown by a broken line in FIG. 14) adjacent to and surrounding the pixel region 40. When the diameter c is sufficiently large, the liquid crystal molecules are oriented in axial symmetry within each liquid crystal region in the presence of an applied voltage. However, when the diameter c is less than about 5 µm, the axially symmetric orientation is not obtained in the presence of an applied voltage.

Example 8

Figure 15:
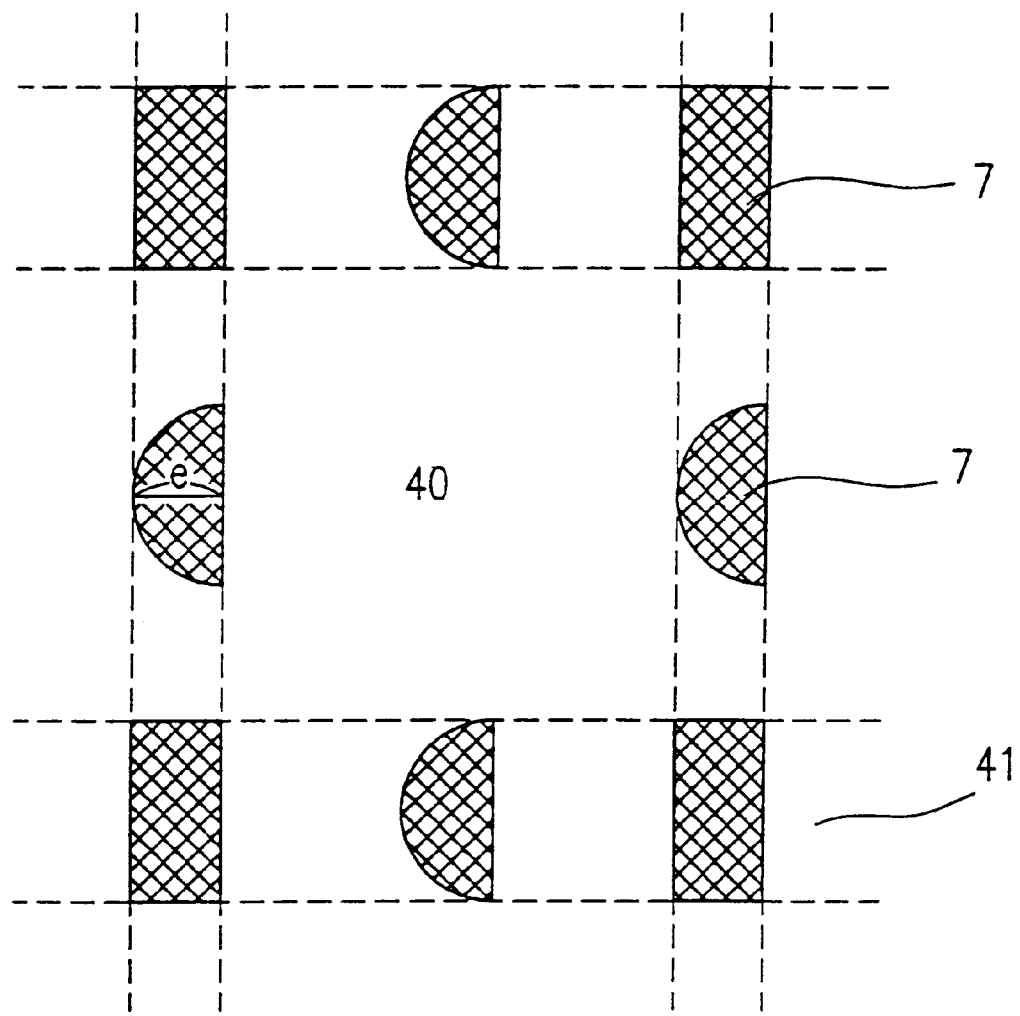
FIG. 15 is a schematic view illustrating another exemplary arrangement of pillar-like spacers in a liquid crystal cell produced according to Example 8 of the present invention.

The transparent signal electrode 3 of ITO having a thickness of about 100 nm is formed on the glass substrate 1 (e.g., 7059: from Corning Inc.). V259-PA (from Nippon Chemical Steel Co., Ltd.) is spin-coated on the transparent signal electrode 3 so as to be about 5 µm in thickness, heated for about 3 minutes at about 100° C. on a hot plate, and further heated for about 10 minutes in a circulation oven at about 80° C. The resultant structure is subjected to exposure using a mask, development and baking, as in Example 6. The mask used in the present example is such that rectangular pillar-like spacers 7 are provided at the four corners of each liquid crystal region 40 (about 100 µm by about 100 µm in size) and semicircular pillar-like spacers 7 are provided at respective points which substantially equidistantly bisect the sides of the liquid crystal region 40, with each semicircular pillar-like spacer 7 having a radius of e, as illustrated in FIG. 15. The subsequent processes are performed as in Example 6, thus forming the pillar-like spacers 7. Then, the glass substrates 1 and 2 are attached together, thereby producing a liquid crystal cell.

A liquid crystal material having a negative dielectric anisotropy ($\Delta\epsilon$=about −4.0, $\Delta n$=about 0.08, with a chiral agent added to have an about 90° twist within a cell gap of about 5 µm) is injected into the produced liquid crystal cell. The resultant structure was observed by a polarization microscope in a crossed Nicols state.

When the radius e of the circular pillar-like spacer 7 is greater than the line width b of the black matrix (i.e., e>b), the pillar-like spacer 7 extends beyond the black matrix, thereby reducing the aperture ratio of the device. When the radius e is sufficiently large, the liquid crystal molecules are oriented in axial symmetry within each liquid crystal region in the presence of an applied voltage. However, when the radius e is less than about 5 µm, the axially symmetric orientation is not obtained in the presence of an applied voltage.

Example 9

Figure 16A:
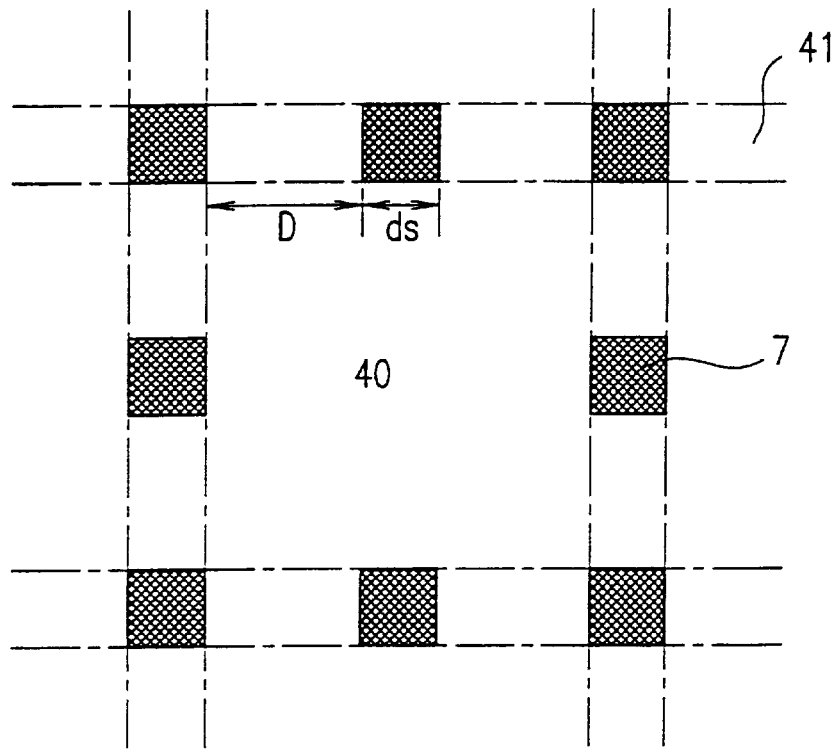
FIGS. 16A and 16B are schematic views illustrating other exemplary arrangements of pillar-like spacers in a liquid crystal cell produced according to Example 9 of the present invention.
Figure 16B:
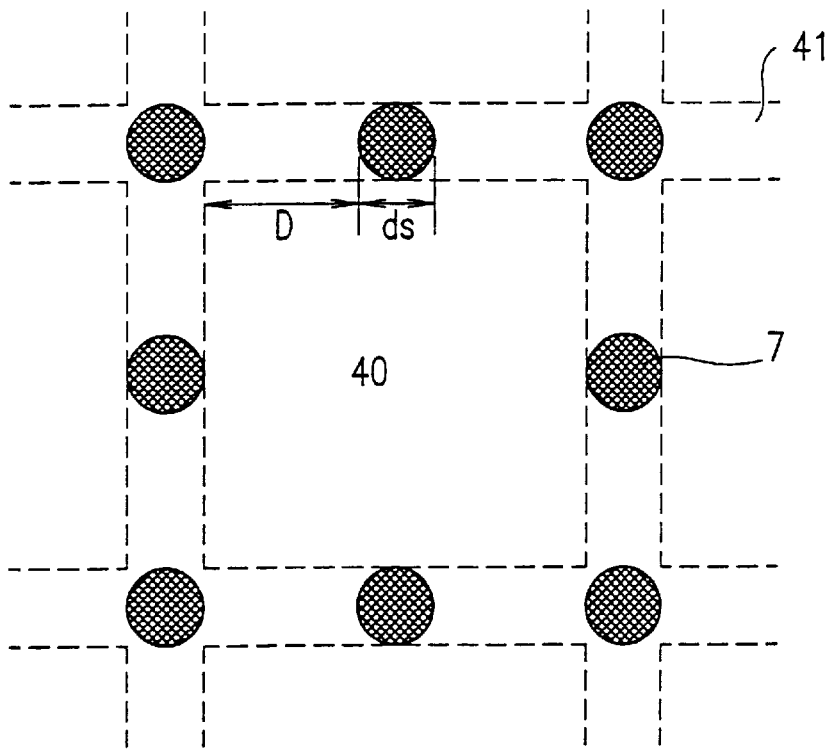

The transparent signal electrode 3 of ITO having a thickness of about 100 nm is formed on the glass substrate 1 (e.g., 7059: from Corning Inc.). JNPC-43 (from Japan Synthetic Rubber Co., Ltd.) is spin-coated on the transparent signal electrode 3 so as to be about 5 µm in thickness, and heated for about 3 minutes at about 80° C. on a hot plate. The resultant structure is subjected to contact exposure for about 60 seconds using a mask. The mask used in the present example is such that square or circular pillar-like spacers 7 are provided at the four corners of each liquid crystal region 40 and at respective points which substantially equidistantly bisect the sides of the liquid crystal region 40, as illustrated in FIGS. 16A and 16B. The mask used in the present example may have any one of combinations of a value ds (a length of a side or a diameter of the pillar-like spacer 7) and a value D (an interval between two adjacent pillar-like spacers 7) as listed in Table 1 below. The illumination in the exposure step is about 10 mW/cm² at about 365 nm. The exposed structure is developed for about 150 seconds with a developing solution CD (about 15% dilution, about 25° C.), rinsed for about 120 seconds in a pure water shower, and post-baked for about one hour in a circulation oven at about 200° C., thus forming the pillar-like spacers 7.

A vertical alignment film (e.g., JALS-204: from Japan Synthetic Rubber Co., Ltd.) is applied on a side of the substrate to be about 80 nm in thickness, and post-baked for about one hour at about 180° C., thus forming the alignment film layer 5a.

The vertical alignment film (e.g., JALS-204: from Japan Synthetic Rubber Co., Ltd.) is applied also on a side of the substrate 2 on which the transparent signal electrode 4 of ITO has been formed with a thickness of about 100 nm, thus forming the alignment film layer 5b. Then, the glass substrates 1 and 2 are attached together via a sealing agent, thereby producing a liquid crystal dielectric anisotropy (Δε=about −4.0, Δn=about 0.08, with a chiral agent added to have an about 90° twist within a cell gap of about 5 μm) is injected into the produced liquid crystal cell. The resultant structure was observed by a polarization microscope in a crossed Nicols state.

TABLE 1

Length of each side or diameter of spacer (ds), spacer interval (D) and y (= D/ds)

| ds (μm) | 10 | 10 | 10 | 10 | 10 | 10 | 10 | 20 | 20 | 20 | 20 | 20 | 20 |
|---|---|---|---|---|---|---|---|---|---|---|---|---|---|
| D (μm) | 10 | 15 | 20 | 25 | 30 | 35 | 40 | 20 | 30 | 40 | 50 | 60 | 70 |
| y (D/ds) | 1.0 | 1.5 | 2.0 | 2.5 | 3.0 | 3.5 | 4.0 | 1.0 | 1.5 | 2.0 | 2.5 | 3.0 | 3.5 |
| ds | 30 | 30 | 30 | 30 | 30 | 30 | 40 | 40 | 40 | 40 | | | |
| D | 15 | 30 | 45 | 60 | 75 | 90 | 20 | 40 | 50 | 60 | | | |
| y | 0.5 | 1.0 | 1.5 | 2.0 | 2.5 | 3.0 | 0.5 | 1.0 | 1.25 | 1.5 | | | |
| ds | 40 | 40 | 40 | 50 | 50 | 50 | 50 | 50 | 50 | 50 | | | |
| D | 70 | 80 | 100 | 25 | 50 | 60 | 70 | 80 | 90 | 100 | | | |
| y | 1.75 | 2.0 | 2.5 | 0.5 | 1.0 | 1.2 | 1.4 | 1.6 | 1.8 | 2.0 | | | |

Observation of the respective produced liquid crystal cells by a polarization microscope in a crossed Nicols state in the presence of an applied voltage through the liquid crystal layer showed that there were various liquid crystal cells (from those exhibiting a good axially symmetric orientation of liquid crystal molecules to those exhibiting a poor axially symmetric orientation).

Each of the produced liquid crystal cells was evaluated by determining how many pixels out of about 300 pixels of the cell exhibit a good axially symmetric orientation, and the produced liquid crystal cells were classified into three groups, which are denoted, in FIG. 17, by respective symbols: "○"(a "good" liquid crystal cell with about 90% or more of the pixels exhibiting a good axially symmetric orientation and with no or little roughness or non-uniformity observed on gray-level display); "Δ" (a "gray-zone" liquid crystal cell with about 70% to about 90% of the pixels exhibiting a good axially symmetric orientation and with slight roughness or non-uniformity observed on gray-level display; the "gray-zone" liquid crystal cell may be usable in some applications, but may be unusable in other applications); and "□" (an "unusable" liquid crystal cell with less than about 70% of the pixels exhibiting a good axially symmetric orientation).

In FIG. 17, the horizontal axis represents a value ds denoting a length of a side of the pillar-like spacer 7 in the case where the pillar-like spacer 7 has a rectangular cross section (FIG. 16A) or a diameter of the pillar-like spacer 7 in a case where the pillar-like spacer 7 has a circular cross section. The vertical axis represents a value y (=D/ds), where D denotes the interval between two adjacent pillar-like spacers 7. Based on FIG. 17, in order to obtain a liquid crystal cell with a satisfactory percentage of pixels exhibiting a good axially symmetric orientation, and which is therefore practically usable in an LCD device, the parameter y should be in a range of:

$$0.1 \leq y \leq 4.49 e^{-0.0607 ds} + 1.5, \text{ and more preferably:}$$

$$0.5 \leq y \leq 4.49 e^{-0.0607 ds} + 1.1.$$

Example 10

Figure 18:
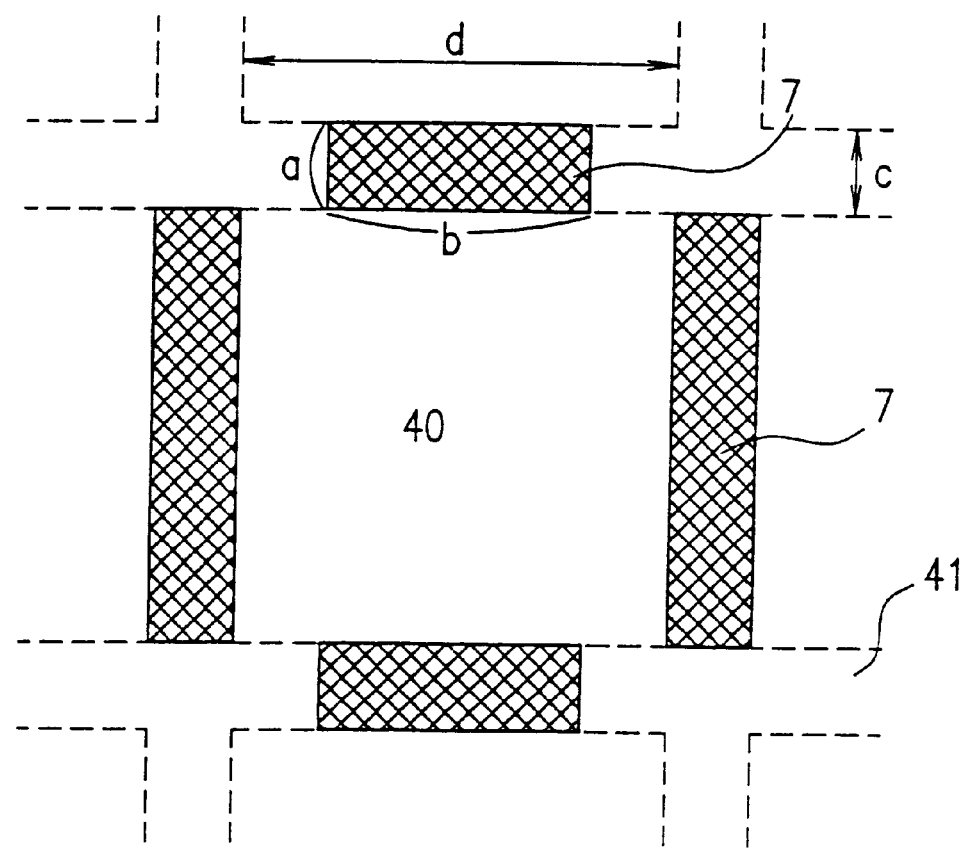
FIG. 18 is a schematic view illustrating another exemplary arrangement of pillar-like spacers in a liquid crystal cell produced according to Example 10 of the present invention.

The transparent signal electrode 3 of ITO having a thickness of about 100 nm is formed on the glass substrate 1 (e.g., 7059: from Corning Inc.). JNPC-43 (from Japan Synthetic Rubber Co., Ltd.) is spin-coated on the transparent signal electrode 3 so as to be about 5 μm in thickness, and heated for about 3 minutes at about 80° C. on a hot plate. The resultant structure is subjected to contact exposure for about 40 seconds using a mask. The mask used in the present example is such that a rectangular pillar-like spacers 7 are provided along the four sides of each liquid crystal region 40, as illustrated in FIG. 18. Referring to FIG. 18, each of opposing two of the four pillar-like spacers 7 has lengths of a and b along directions perpendicular and parallel, respectively, to a side of the liquid crystal region 40 to which the pillar-like spacer 7 is adjacent. For example, when the length d of a side of a liquid crystal region 40 is about 100 μm, the interval c (corresponding to the width of the black matrix) between two adjacent liquid crystal regions is about 20 μm. The illumination in the exposure step is about 10 mW/cm² at about 365 nm. The exposed structure is developed for about 150 seconds with a developing solution CD (about 15% dilution, about 25° C.), rinsed for about 120 seconds in a pure water shower, and post-baked for about one hour in a circulation oven at about 200° C., thus forming the pillar-like spacers 7. When a>c, the pillar-like spacer 7 extends into the liquid crystal region 40, thereby reducing the aperture ratio.

A vertical alignment film (e.g., JALS-204: from Japan Synthetic Rubber Co., Ltd.) is applied on a side of the substrate to be about 80 nm in thickness, and post-baked for about one hour at about 180° C., thus forming the alignment film layer 5a.

The vertical alignment film (e.g., JALS-204: from Japan Synthetic Rubber Co., Ltd.) is applied also on a side of the substrate 2 on which the transparent signal electrode 4 of ITO has been formed with a thickness of about 100 nm, thus forming the alignment film layer 5b. Then, the glass substrates 1 and 2 are attached together via a sealing agent, thereby producing a liquid crystal cell.

A liquid crystal material having a negative dielectric anisotropy (Δε=about −4.0, Δn=about 0.08, with a chiral agent added to have an about 90° twist within a cell gap of about 5 μm) is injected into the produced liquid crystal cell. The resultant structure was observed by a polarization microscope in a crossed Nicols state.

Each of the produced liquid crystal cells was evaluated by determining how many pixels out of about 300 pixels of the cell exhibit a good axially symmetric orientation ("axial symmetry percentage"). The results are shown in Table 2.

TABLE 2

Relationship among length of b, injection time and axial symmetry percentage

| b (μm) | 10 | 15 | 20 | 25 | 30 | 40 | 60 | 80 | 90 | 95 | 99 | 100 |
|---|---|---|---|---|---|---|---|---|---|---|---|---|
| b/d (%) | 10 | 15 | 20 | 25 | 30 | 40 | 60 | 80 | 90 | 95 | 99 | 100 |
| Injection time (h) | <1 | <1 | <1 | 1 | 1.5 | 2 | 3 | 5 | 18 | 28 | 73 | X |
| Axial symmetry percentage (%) | 20 | 60 | 71 | 76 | 83 | 91 | 100 | 100 | 100 | 100 | 100 | X |

In Table 2, the symbol "X" indicates that the liquid crystal material could not be injected, or the axially symmetric orientation could not be achieved because no liquid crystal material was injected. Table 2 shows that as the value b (the length of the pillar-like spacer 7 along a direction parallel to a side of a liquid crystal region to which the pillar-like spacer 7 is adjacent) is longer, the axial symmetry percentage is higher, whereby an LCD device with greater display uniformity can be produced. However, when the length b is substantially equal to the length d of a side of a liquid crystal region, the liquid crystal material cannot be injected into the liquid crystal cell, whereby the LCD device cannot be produced. Therefore, preferably, the value b/d does not exceed about 99%.

As the length b decreases below a particular value, the axial symmetry percentage starts to decrease. This does not cause a significant problem as long as the axially symmetric orientation is achieved for every liquid crystal region. However, as the percentage is lower, more roughness or non-uniformity may be observed when producing a gray-level display. The LCD device is If not practically usable when the percentage is less than about 70%. Therefore, preferably, the value b/d is greater than about 20%. When the axial symmetry percentage is greater than about 90%, no or little roughness of non-uniformity is observed even when producing a gray-level display. When the injection time is too long, problems arise in connection with the production tact time. Accordingly, it is more preferable that the value b/d is about 40% to about 90%.

Embodiment 2

In Embodiment 2, a PALCD device according to the present invention will be described.

FIG. 19 is a schematic cross-sectional view illustrating the PALCD device according to Embodiment 2 of the present invention.

The PALCD device includes a substrate 28 of a transparent glass, or the like, and a plasma generation substrate 22 with a liquid crystal layer 29 interposed therebetween. The plasma generation substrate 22 includes a dielectric sheet 23 and a substrate 24 opposing each other. A stripe pattern of partition walls 27 is provided between the dielectric sheet 23 and a substrate 24 of the plasma generation substrate 22. The partition walls 27, the substrate 24 and the dielectric sheet 23 define a stripe pattern of discharge channels 25 each containing therein a gas to be ionized by discharge. Each discharge channel 25 includes an anode electrode A and a cathode electrode K for ionizing the ionization gas.

A color filter 33 having a structure as that in Embodiment 1 is provided on one side of the substrate 28 which faces the liquid crystal layer 29. A stripe pattern of transparent electrodes 30 serving as data lines are provided so as to cross, e.g., perpendicularly, the stripe pattern of channels 25. The liquid crystal layer 29 is interposed between the substrate 28 and the dielectric sheet 23, and a constant cell gap is maintained therebetween by a plurality of pillar-like spacers 37. In the liquid crystal layer 29, a plurality of liquid crystal regions 26 are defined by the pillar-like spacers 37. An alignment film (not shown) is provided on a surface of each of the substrate 28 and the dielectric sheet 23 which faces the liquid crystal layer 29. A display cell 21 includes the substrate 28, the color filter 33, the transparent electrodes 30 and the liquid crystal layer 29.

A polarizer (not shown) is provided on one side (the upper side in the figure) of the LCD device. Another polarizer (not shown) and a back light (not shown) are provided on the other side of the LCD device.

The LCD device can be produced by a production method substantially the same as that in Embodiment 1 for producing the LCD device illustrated in FIGS. 1A and 1B. In place of the glass substrate 2 in FIG. 3D, the plasma generation substrate 22 as illustrated in FIG. 19 is used. The plasma generation substrate 22 itself can be produced by any production method known in the art.

In the produced LCD device, since the pillar-like spacers 37 are arranged at the corners of each liquid crystal region 26 for each pixel region in the liquid crystal layer 29, the pillar-like spacers 37 can define respective liquid crystal regions 26 in each of which the liquid crystal molecules are oriented in axial symmetry. The pillar-like spacers 37 also serve to maintain the cell gap of the liquid crystal cell. Moreover, since the pillar-like spacers 37 are arranged at the corners of each liquid crystal region 26 for each pixel region, the pillar-like spacers 37 do not obstruct the injection of the liquid crystal material into the cell, whereby the injection rate does not have to be reduced. Thus, the chromatographic phenomenon is less likely to occur, thereby reducing the display non-uniformity which occurs due to the chromatographic phenomenon and therefore improving the display quality of the LCD device.

When an axially symmetric orientation fixing layer as that in Embodiment 1 is provided on at least one of the substrate 28 and the dielectric sheet 23, it is possible to align the axis of each liquid crystal region (in which the liquid crystal molecules are oriented in axial symmetry by the axially symmetric orientation fixing layer) with a predetermined position, thereby providing a stable axially symmetric orientation.

Preferably, the pillar-like spacers 37 are arranged so as to be substantially within the black matrix of the color filter 33 (or to have as little portion thereof as possible extending beyond the black matrix), as illustrated in FIGS. 20A to 20C. The alignment of the pillar-like spacers 37 with the black matrix preferably improves light transmittance and increases the display area of the LCD device.

According to Embodiment 2, a vertical alignment layer is provided on a surface of each of the dielectric sheet 23 and the substrate 28 which faces the liquid crystal layer 29. Therefore, when the liquid crystal layer 29 employs a liquid crystal material which has a negative dielectric anisotropy, the liquid crystal molecules can be aligned substantially perpendicular to the surfaces of the substrate in the absence of an applied voltage and in axial symmetry within each liquid crystal region in the presence of an applied voltage. Therefore, it is possible to realize a high contrast display having a good viewing angle characteristic where the liquid crystal molecules are oriented in axial symmetry within each of the liquid crystal regions.

Moreover, the polarizers are arranged so that the respective polarization axes are perpendicular to each other, and the liquid crystal molecules are aligned substantially perpendicular to the surfaces of the substrate in the absence of an applied voltage. Therefore, light incident upon the liquid crystal panel through one of the polarizers is not transmitted through the liquid crystal panel, thereby producing a high quality black display and thus obtaining a high contrast.

Figure 21A:
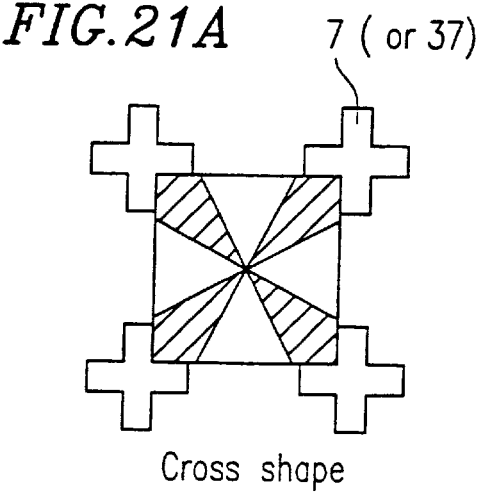
FIGS. 21A to 21F are each a schematic view illustrating a cross-sectional shape of a pillar-like spacer which can suitably be used in the present invention.
Figure 21B:
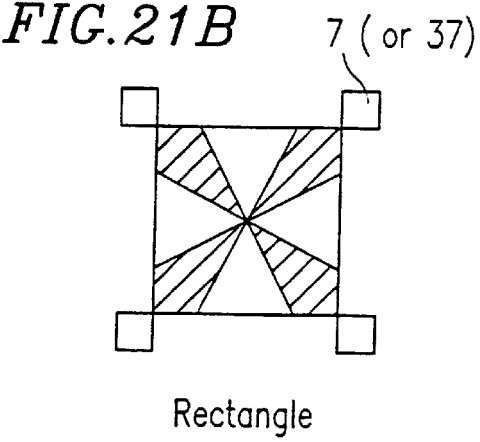
Figure 21C:
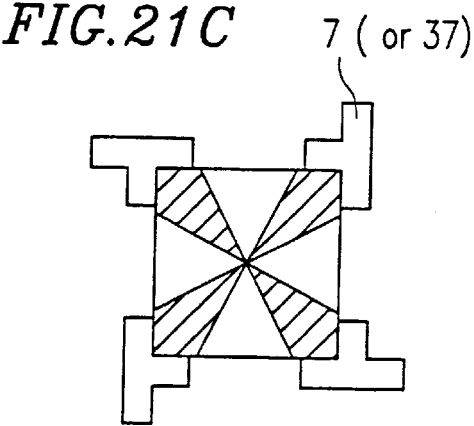
Figure 21D:
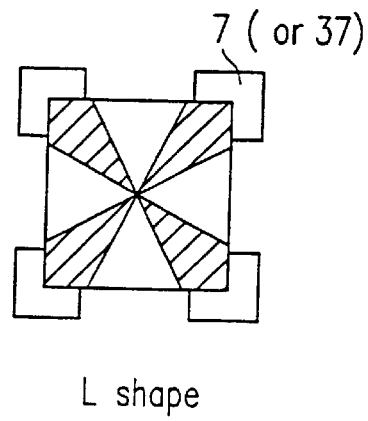
Figure 21E:
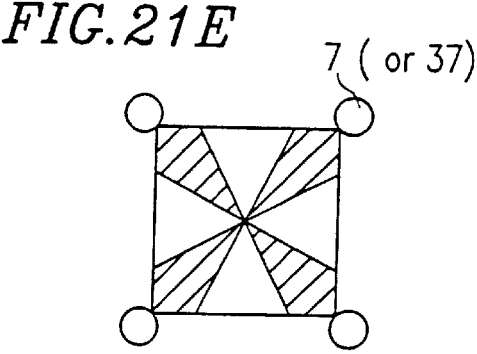
Figure 21F:
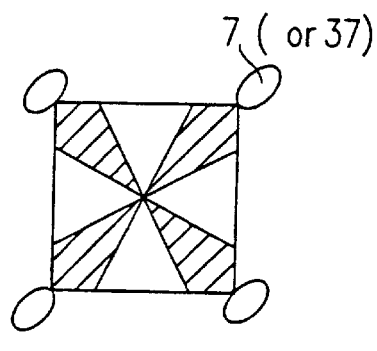
Figure 22A:
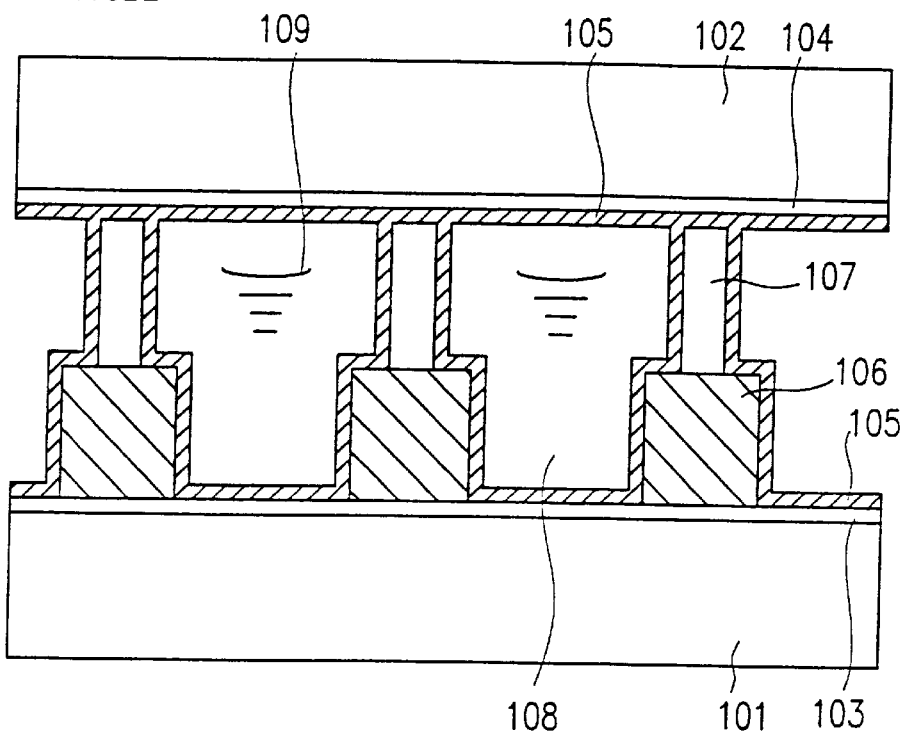
FIGS. 22A and 22B schematically illustrate a conventional LCD device, where
Figure 22B:
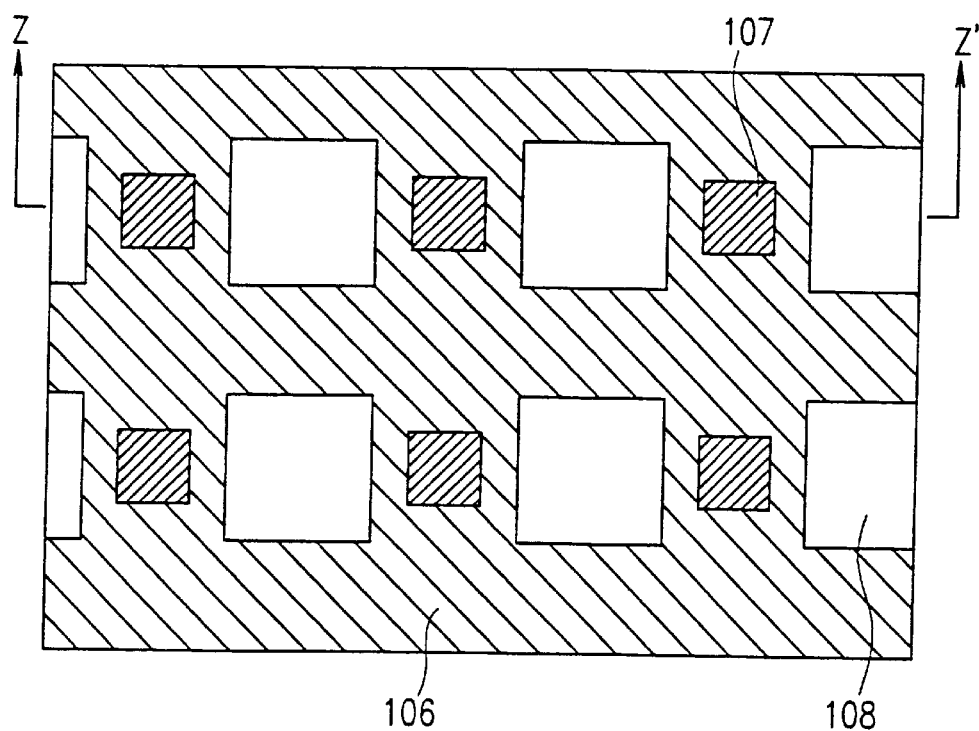
Figure 23:
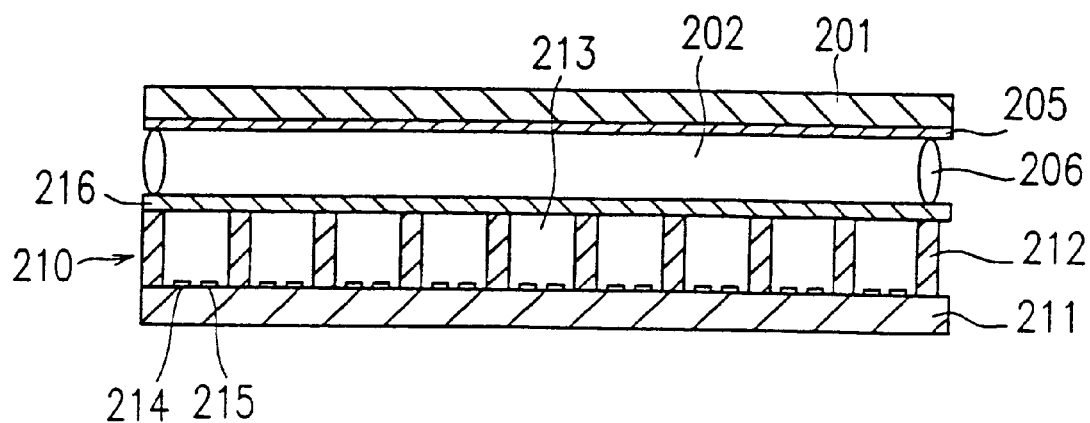
FIG. 23 is a schematic cross-sectional view illustrating a conventional PALCD device.
Figure 24A:
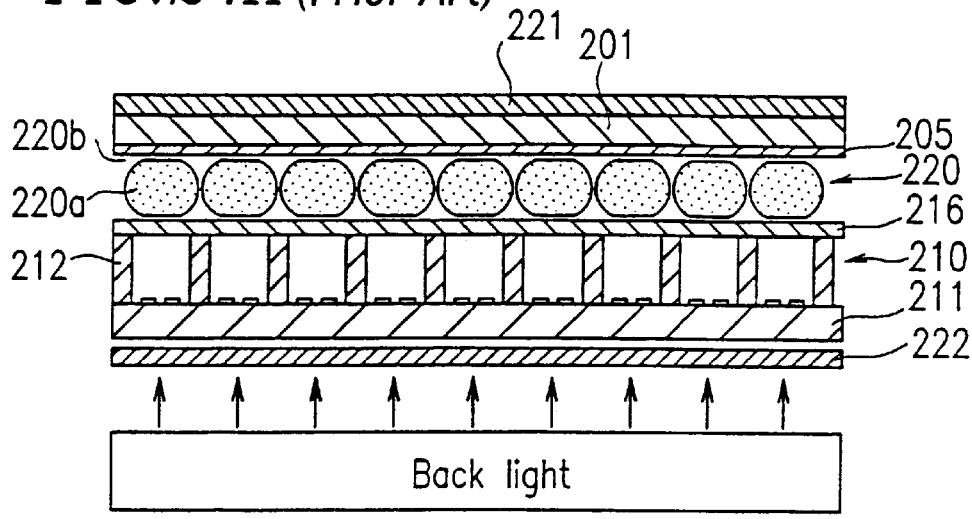
FIGS. 24A and 24B schematically illustrate another conventional LCD device, where
Figure 24B:
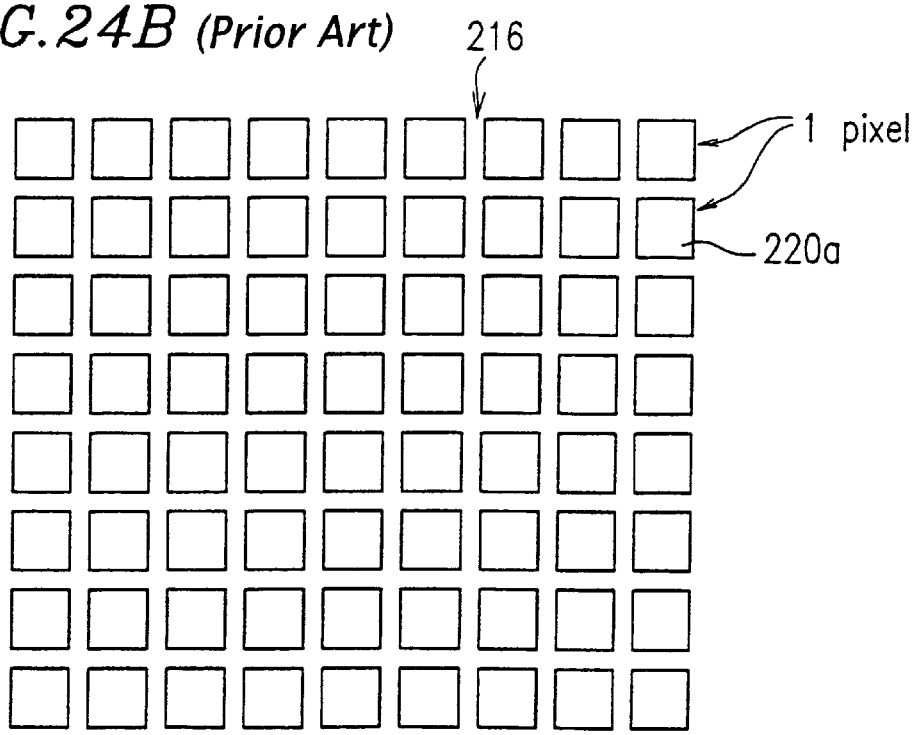
Figure 25A:
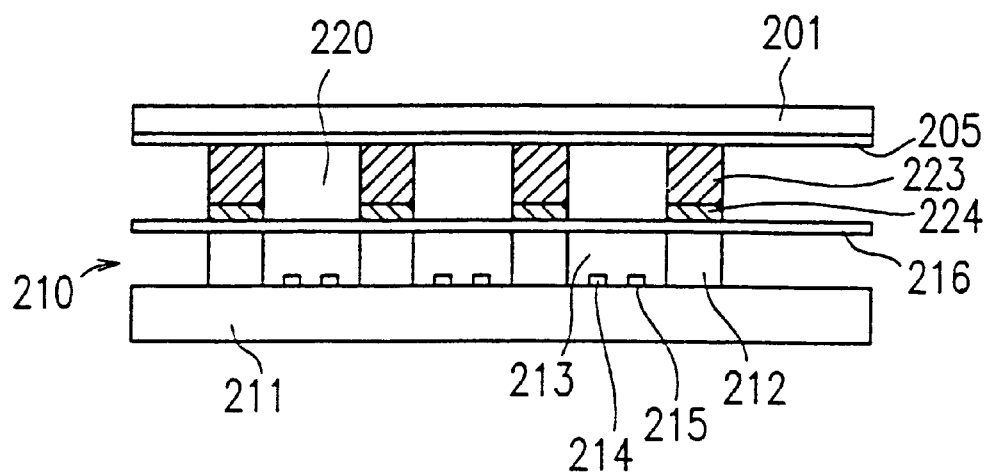
FIGS. 25A and 25B schematically illustrate still another conventional LCD device, where
Figure 25B:
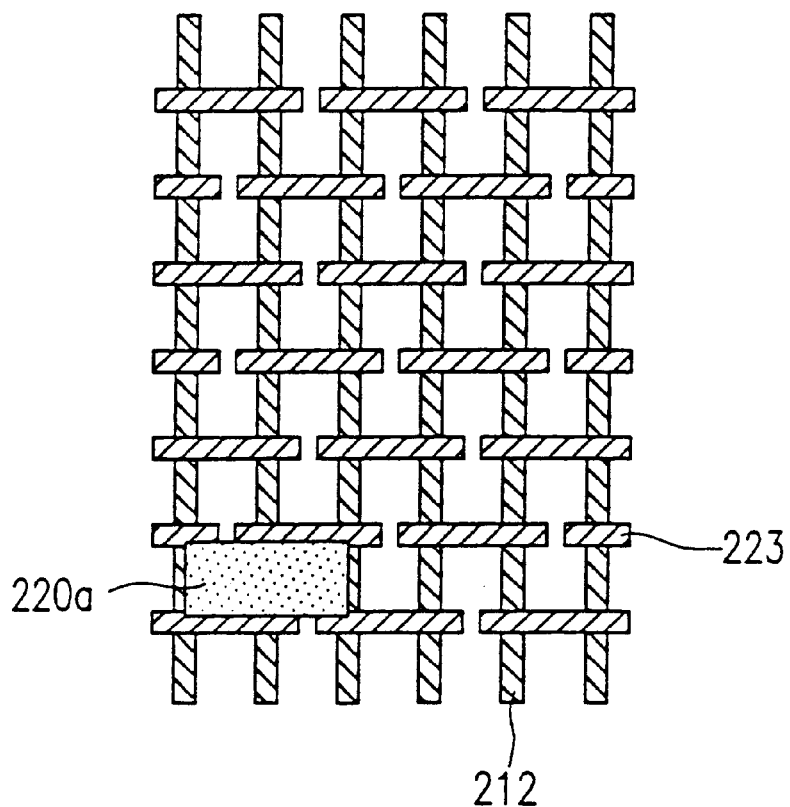

While the cross section of the pillar-like spacer according to Embodiment 1 or 2 may have a cross shape, as illustrated in FIG. 21A, the cross section of the pillar-like spacer of the present invention may take any other shape. For example, other possible shapes of the cross section of the pillar-like spacer used in the present invention include a rectangle, a T shape, an L shape, a circle and an ellipse, as illustrated in FIG. 21B to 21F, respectively, and any variations thereof. It is also understood that any of the other shapes and the other arrangements of the pillar-like spacer as illustrated in Examples 3 to 10 of the present invention may be used in Embodiment 2 of the present invention.

As described above, since the pillar-like spacers are provided only partially in each pixel region, the pillar-like spacers will not obstruct the injection of the liquid crystal material into the cell, whereby the injection rate does not have to be reduced. Thus, the chromatographic phenomenon is less likely to occur, thereby reducing the display non-uniformity which occurs due to the chromatographic phenomenon and therefore improving the display quality of the LCD device.

Due to the presence of the vertical alignment layer, the liquid crystal molecules in contact with the vertical alignment layer can be aligned substantially perpendicular to the vertical alignment layer. Since the pillar-like spacers are preferably provided at least at four positions around each of the pixel regions, the pillar-like spacers can define respective liquid crystal regions in each of which the liquid crystal molecules are oriented in axial symmetry. The pillar-like spacers also serve to maintain the cell gap of the liquid crystal cell.

Therefore, according to the present invention, it is possible to provide a high contrast display having a good viewing angle characteristic where the liquid crystal molecules are oriented in axial symmetry within each of the liquid crystal regions. Thus, the LCD device of the present invention can suitably be used in a flat display in a personal computer, a word processor, an amusement apparatus, a TV set, or in a display plate, a window, a door, a wall, or the like, utilizing a shutter effect. Moreover, the LCD device of the present invention can also be used in a large-screen flat display device for use in a high quality TV (e.g., HDTV), a flat display for CAD applications, or the like.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device, comprising:
   first and second substrates;
   a liquid crystal layer interposed between the first and second substrates;
   a plurality of pillar-like spacers for defining a gap between the first and second substrates;
   a plurality of electrodes provided on a side of each of the first and second substrates which faces the liquid crystal layer, for applying a voltage through the liquid crystal layer; and
   a plurality of pixel regions defined by the plurality of electrodes, wherein:
   the liquid crystal layer has liquid crystal molecules having a negative dielectric anisotropy;
   a vertical alignment layer is provided on a surface of each of the first and second substrates which faces the liquid crystal layer and on surfaces of the pillar-like spacers;
   the liquid crystal layer includes a plurality of liquid crystal regions defined by the plurality of pillar-like spacers, each of the pillar-like spacers extending through a substantial portion of an adjacent liquid crystal region;
   each of the pixel regions includes at least one of the liquid crystal regions; and
   the liquid crystal molecules in the liquid crystal regions are aligned substantially perpendicular to the surfaces of the first and second substrates in an absence of an applied voltage and in axial symmetry in a presence of an applied voltage.

2. A liquid crystal display device according to claim 1, wherein an axially symmetric orientation fixing layer of a polymer material is provided on at least one of the vertical alignment layers provided on the surfaces of the first and second substrates which face the liquid crystal layer.

3. A liquid crystal display device according to claim 2, wherein the pillar-like spacers are provided at least at four positions around each of the pixel regions.

4. A liquid crystal display device according to claim 3, wherein the pillar-like spacers are arranged in at least one of point symmetry and line symmetry within each of the pixel regions.

5. A liquid crystal display device according to claim 3, wherein the pillar-like spacers are arranged to be in contact with, respectively, four corners or four sides of each of the pixel regions.

6. A liquid crystal display device according to claim 5, wherein a cross section of each of the pillar-like spacers along a plane parallel to the surfaces of the first and second substrates is selected from the group consisting of a rectangle, a rectangle with rounded corners, a cross, a T shape, an L shape, a circle and an ellipse.

7. A liquid crystal display device according to claim 5, wherein the pillar-like spacers are provided at each corner of, and at least at two substantially equidistantly-divided positions along each side of, each of the pixel regions.

8. A liquid crystal display device according to claim 7, wherein:
   a cross section of each of the pillar-like spacers along a plane parallel to the surfaces of the first and second substrates is selected from the group consisting of a rectangle, a rectangle with rounded corners, a circle and a semicircle;
   a rectangle which circumscribes the pillar-like spacers for each of the pixel regions has a size such that the rectangle can fit within an area defined by ones of the pixel regions adjacent to and surrounding the pixel region; and
   a shorter side or diameter of each of the pillar-like spacers is about 5 $\mu$m or longer.

9. A liquid crystal display device according to claim 7, wherein $0.1 \leq y \leq 4.49 e^{-0.0607 ds}+1.5$, where:

y=D/ds;

D denotes an interval between two adjacent ones of the pillar-like spacers; and ds denotes a length of a shorter side of a rectangular cross section of the pillar-like spacer in a case where the pillar-like spacer has a rectangular cross section, or a diameter of a circular cross section of the pillar-like spacer in a case where the pillar-like spacer has a circular cross section.

10. A liquid crystal display device according to claim 1, wherein the pillar-like spacers are arranged to be in contact with, respectively, four sides of each of the pixel regions at respective positions excluding corners of the pixel region.

11. A liquid crystal display device according to claim 10, wherein:

a cross section of each of the pillar-like spacers along a plane parallel to the surfaces of the first and second substrates is selected from the group consisting of a rectangle and a rectangle with rounded corners;

a side of each of the pillar-like spacers, which is perpendicular to a side of the pixel region with which the pillar-like spacer is in contact, is about 5 μm or longer and shorter than an interval between two adjacent ones of the pixel regions;

another side of each of the pillar-like spacers, which is parallel to the side of the pixel region with which the pillar-like spacer is in contact, is longer than about 20% and shorter than about 90% of a length of the side of the pixel region.

12. A plasma addressed liquid crystal display device, comprising:

a plasma generation substrate including a first substrate, a dielectric sheet opposing the first substrate, and a plurality of discharge channels arranged in a stripe pattern, each of the discharge channels being defined by the first substrate, the dielectric sheet and one or more partition walls provided between the first substrate and the dielectric sheet;

a second substrate opposing the dielectric sheet of the plasma generation substrate with a constant gap therebetween, the second substrate including a plurality of signal electrodes provided on a surface of the second substrate which faces the dielectric sheet, the signal electrodes being arranged in a stripe pattern crossing the stripe pattern of the discharge channels;

a liquid crystal layer interposed between the dielectric sheet and the second substrate;

a plurality of pillar-like spacers for defining a gap between the dielectric sheet and the second substrate; and a plurality of pixel regions each defined as an area where one of the signal electrodes intersects one of the discharge channels, wherein:

the liquid crystal layer has liquid crystal molecules having a negative dielectric anisotropy;

a vertical alignment layer is provided on a surface of each of the dielectric sheet and the second substrate which faces the liquid crystal layer and on surfaces of the pillar-like spacers;

the liquid crystal layer includes a plurality of liquid crystal regions defined by the plurality of pillar-like spacers;

each of the pixel regions includes at least one of the liquid crystal regions; and the liquid crystal molecules in the liquid crystal regions are aligned substantially perpendicular to the surfaces of the first and second substrates in an absence of an applied voltage and in axial symmetry in a presence of an applied voltage.

13. A liquid crystal display device according to claim 12, wherein an axially symmetric orientation fixing layer of a polymer material is provided on at least one of the vertical alignment layers provided on the surfaces of the dielectric sheet and the second substrate which face the liquid crystal layer.

14. A liquid crystal display device according to claim 13, wherein the pillar-like spacers are provided at least at four positions around each of the pixel regions.

15. A liquid crystal display device according to claim 14, wherein the pillar-like spacers are arranged in at least one of point symmetry and line symmetry within each of the pixel regions.

16. A liquid crystal display device according to claim 14, wherein the pillar-like spacers are arranged to be in contact with, respectively, four corners or four sides of each of the pixel regions.

17. A liquid crystal display device according to claim 16, wherein a cross section of each of the pillar-like spacers along a plane parallel to the surfaces of the first and second substrates is selected from the group consisting of a rectangle, a rectangle with rounded corners, a cross, a T shape, an L shape, a circle and an ellipse.

18. A liquid crystal display device according to claim 16, wherein the pillar-like spacers are provided at each corner of, and at least at two substantially equidistantly-divided positions along each side of, each of the pixel regions.

19. A liquid crystal display device according to claim 18, wherein:

a cross section of each of the pillar-like spacers along a plane parallel to the surfaces of the first and second substrates is selected from the group consisting of a rectangle, a rectangle with rounded corners, a circle and a semicircle;

a rectangle which circumscribes the pillar-like spacers for each of the pixel regions has a size such that the rectangle can fit within an area defined by ones of the pixel regions adjacent to and surrounding the pixel region; and a shorter side or diameter of each of the pillar-like spacers is about 5 μm or longer.

20. A liquid crystal display device according to claim 18, wherein $0.1 \leq y \leq 4.49 e^{-0.0607 ds}+1.5$, where:

y=D/ds;

D denotes an interval between two adjacent ones of the pillar-like spacers; and ds denotes one of a length of a shorter side of the pillar-like spacer in a case where the pillar-like spacer has a rectangular cross section and a diameter of the pillar-like spacer in a case where the pillar-like spacer has a circular cross section.

21. A liquid crystal display device according to claim 12, wherein the pillar-like spacers are arranged to be in contact with, respectively, four sides of each of the pixel regions at respective positions excluding corners of the pixel region.

22. A liquid crystal display device according to claim 21, wherein:

a cross section of each of the pillar-like spacers along a plane parallel to the surfaces of the first and second substrates is selected from the group consisting of a rectangle and a rectangle with rounded corners;

a side of each of the pillar-like spacers, which is perpendicular to a side of the pixel region with which the pillar-like spacer is in contact, is about 5 μm or longer and shorter than an interval between two adjacent ones of the pixel regions;

another side of each of the pillar-like spacers, which is parallel to the side of the pixel region with which the pillar-like spacer is in contact, is longer than about 20% and shorter than about 90% of a length of the side of the pixel region.

23. A method of making a liquid crystal display, the method comprising the steps of:

providing first and second substrates;

providing a plurality of electrodes on at least one of the first and second substrates, the electrodes for enabling a voltage to be applied through a liquid crystal layer;

using a deposition process to form a plurality of pillar-like spacers on the first substrate, the pillar-like spacers for defining a gap between the first and second substrates;

forming a vertical liquid crystal alignment layer on the first substrate and on surfaces of respective ones of the pillar-like spacers;

forming a vertical liquid crystal alignment layer on the second substrate;

providing a liquid crystal layer including liquid crystal molecules having negative dielectric anisotropy between the first and second substrates so as to form a plurality of different liquid crystal regions, each liquid crystal region being defined by corresponding pillar-like spacers, and wherein each pixel region includes at least one of the liquid crystal regions; and forming the vertical alignment layers and providing the liquid layer in a manner such that liquid crystal molecules in the liquid crystal regions are aligned substantially perpendicular to surfaces of the first and second substrates in an absence of an applied voltage, and in axial symmetry in a presence of an applied voltage.

* * * * *